US012562497B2

(12) United States Patent
Chang et al.

(10) Patent No.: US 12,562,497 B2
(45) **Date of Patent: *Feb. 24, 2026**

(54) ELECTROMAGNETIC WAVE REFLECTING STRUCTURE AND MANUFACTURING METHOD THEREOF

(71) Applicant: NATIONAL CHUNG CHENG UNIVERSITY, Chiayi County (TW)

(72) Inventors: Sheng-Fuh Chang, Chiayi County (TW); Chia-Chan Chang, Chiayi (TW); Shih-Cheng Lin, Taitung County (TW); Wei-Yang Chen, Changhua County (TW); Yu-Cheng Lin, Taichung (TW)

(73) Assignee: National Chung Cheng University, Chiayi County (TW)

( * ) Notice: Subject to any disclaimer, the term of this patent is extended or adjusted under 35 U.S.C. 154(b) by 298 days.

This patent is subject to a terminal disclaimer.

(21) Appl. No.: 18/356,470

(22) Filed: Jul. 21, 2023

(65) Prior Publication Data

US 2023/0361477 A1 Nov. 9, 2023

Related U.S. Application Data

(62) Division of application No. 17/171,342, filed on Feb. 9, 2021, now Pat. No. 11,777,225.

(30) Foreign Application Priority Data

Jul. 24, 2020 (TW) ................................ 109125161

(51) Int. Cl.
*H01Q 15/14* (2006.01)
*H01Q 15/00* (2006.01)

(52) U.S. Cl.
CPC ....... *H01Q 15/148* (2013.01); *H01Q 15/0086* (2013.01); *H01Q 15/147* (2013.01)

(58) Field of Classification Search
CPC .......... H01Q 15/141-142; H01Q 15/147-148; H01Q 15/0086
See application file for complete search history.

(56) References Cited

U.S. PATENT DOCUMENTS

2020/0381839 A1* 12/2020 Shahvirdi Dizaj Yekan ............... H01Q 15/0086

FOREIGN PATENT DOCUMENTS

CN 106207468 A * 12/2016 ........... H01Q 15/148

OTHER PUBLICATIONS

Bakhoda, et al., "A Low Profile Single Layer X-band Reflectarray Antenna Using a Novel Unit Cell," 26th Iranian Conference on Electrical Engineering (ICEE2018), May 2018, pp. 538-541. (Year: 2018).*

(Continued)

*Primary Examiner* — Amal Patel
(74) *Attorney, Agent, or Firm* — Rosenberg, Klein & Lee

(57) ABSTRACT

A method of manufacturing an electromagnetic wave reflecting structure includes the steps of presetting an operating frequency, a reflected wave pointing angle, an incident wave pointing angle, and an incident distance of an electromagnetic wave; obtaining an electromagnetic wave reflecting structure phase distribution of an electromagnetic wave reflecting structure according to the operating frequency, the reflected wave pointing angle, the incident wave pointing angle, and the incident distance; and arranging a plurality of reflecting elements on a substrate according to (Continued)

the electromagnetic wave reflecting structure phase distribution and a reflecting element phase curve of any one of the reflecting elements at the operating frequency.

8 Claims, 39 Drawing Sheets

(56) References Cited

OTHER PUBLICATIONS

English translation of CN-106207468-A (Year: 2016).*

* cited by examiner

ELECTROMAGNETIC WAVE REFLECTING STRUCTURE AND MANUFACTURING METHOD THEREOF

CROSS-REFERENCE TO RELATED APPLICATION

This application is a divisional application of U.S. application Ser. No. 17/171,342, filed on Feb. 9, 2021, which claims priority from Taiwanese Patent Application No. 109125161, filed on Jul. 24, 2020.

TECHNICAL FIELD

The present disclosure relates to an electromagnetic wave reflecting structure and a manufacturing method thereof, and more particularly to an electromagnetic wave reflecting structure manufactured by calculating a phase distribution of the electromagnetic wave reflecting structure and arranging a plurality of reflecting elements and a manufacturing method thereof.

BACKGROUND

In mobile communication systems, the short wavelength and high loss of electromagnetic waves as well as the shielding of buildings, trees, furniture, signboards, etc., often result in communication blind spots, blind zones, or weak signal areas. The existing solution is to use additional base stations or signal boosters. Therefore, when deploying base stations, densely deploying thousands of small base stations or signal boosters will become a large project that costs a lot of costs and manpower and consumes considerable power. Subsequent maintenance works are time-consuming and labor-intensive, and even put the residents near the base stations under psychological pressure.

SUMMARY

The first objective of the present disclosure is to provide an electromagnetic wave reflecting structure that reduces the cost of deployment and maintenance.

The electromagnetic wave reflecting structure of the present disclosure is used for guiding an electromagnetic wave emitted from an electromagnetic wave source to be reflected at a reflected wave pointing angle, wherein the electromagnetic wave is incident at an incident wave pointing angle at an operating frequency. The electromagnetic wave reflecting structure includes a substrate and a plurality of reflecting elements.

The substrate has a surface on which a reference point is defined. The plurality of reflecting elements are disposed on the surface. A reflection phase shift of the i-th reflecting element among the reflecting elements is related to a coordinate location of the i-th reflecting element with respect to the reference point, a wave number at the operating frequency, the reflected wave pointing angle, and an incident distance of the electromagnetic wave source to the i-th reflecting element. A size of the i-th reflecting element among the reflecting elements is related to the reflection phase shift of the i-th reflecting element on the substrate and a reflection phase of any one of the reflecting elements at the operating frequency.

The second objective of the present disclosure is to provide an electromagnetic wave reflecting structure that reduces the cost of deployment and maintenance.

The electromagnetic wave reflecting structure is used for guiding a plurality of electromagnetic waves emitted from a plurality of electromagnetic wave sources to be reflected at a plurality of reflected wave pointing angles. The electromagnetic waves are incident at an operating frequency and each is incident at a respective incident wave pointing angle. The electromagnetic wave reflecting structure includes a substrate and a plurality of reflecting elements.

The substrate has a surface on which a reference point is defined. The reflecting elements are disposed on the surface, wherein a synthetic reflection phase shift of the i-th reflecting element among the reflecting elements is related to different incident distances of the plurality of electromagnetic wave sources and a phasor superposition of a plurality of reflected phase shifts of the i-th reflecting element corresponding to the plurality of reflected wave pointing angles. Each reflection phase shift of the i-th reflecting element is related to a coordinate location of the i-th reflecting element with respect to the reference point, a wave number at the operating frequency, a respective one of the reflected wave pointing angles, and the incident distance of a corresponding one of the plurality of electromagnetic wave sources to the i-th reflecting element. A size of the i-th reflecting element is related to the synthetic reflection phase shift of the i-th reflecting element on the substrate and a reflection phase of any one of the reflecting elements at the operating frequency.

The third objective of the present disclosure is to provide a reflecting element with broad bandwidth and multiple applicable sizes.

The reflecting element of the present disclosure includes two first metal sheets and two second metal sheets.

Each first metal sheet has a horseshoe shape. The first metal sheets are arranged facing each other to form a rectangle. A first spacing is defined between the first metal sheets. Each second metal sheet is substantially rectangular. The second metal sheets are arranged side by side between the first metal sheets. A second spacing is defined between the second metal sheets. A size of the reflecting element is a length of any one of the second metal sheets.

The fourth objective of the present disclosure is to provide an electromagnetic wave reflecting structure that reduces the cost of deployment and maintenance.

The electromagnetic wave reflecting structure is used for guiding an electromagnetic wave emitted from an electromagnetic wave source to be reflected at a plurality of reflected wave pointing angles. The electromagnetic wave has an operating frequency and is incident at an incident wave pointing angle. The electromagnetic wave reflecting structure includes a substrate and a plurality of reflecting elements.

The substrate has a surface on which a reference point is defined. The reflecting elements are disposed on the surface. Wherein, a synthetic reflection phase shift of the i-th reflecting element among the reflecting elements is related to a phasor superposition of a a plurality of reflected phase shifts of the i-th reflecting element, which correspond to the plurality of reflected wave pointing angles respectively. Each reflection phase shift of the i-th reflecting element is related to a coordinate location of the i-th reflecting element with respect to the reference point, a wave number at the operating frequency, a respective one of the reflected wave pointing angles, and an incident distance of the electromagnetic wave source to the i-th reflecting element. A size of the i-th reflecting element among the reflecting elements is related to the synthetic reflection phase shift of the i-th reflecting element on the substrate and a reflection phase of any one of the reflecting elements at the operating frequency.

The fifth objective of the present disclosure is to provide a method of manufacturing electromagnetic wave reflecting structures that reduce the cost of deployment and maintenance.

The method of manufacturing electromagnetic wave reflecting structures of the present disclosure including the steps of:

presetting a respective incident wave pointing angle and a respective incident distance for each of a plurality of electromagnetic waves;

presetting an operating frequency for the plurality of electromagnetic waves;

presetting a plurality of reflected wave pointing angles;

obtaining a plurality of electromagnetic wave reflecting structure phase distributions, each of which corresponds to a respective one of the reflected wave pointing angles, of each electromagnetic wave according to the operating frequency, the incident wave pointing angle, and the incident distance of each electromagnetic wave as well as the reflected wave pointing angles;

converting the plurality of electromagnetic wave reflecting structure phase distributions of each electromagnetic wave into a plurality of electromagnetic wave reflecting structure phasor distributions, respectively;

superposing the plurality of the electromagnetic wave reflecting structure phasor distributions of all the electromagnetic waves and performing and performing a conversion to obtain a synthetic electromagnetic wave reflecting structure phase distribution; and arranging a plurality of reflecting elements on a substrate according to the synthetic electromagnetic wave reflecting structure phase distribution and a reflecting element phase curve of any one of the reflecting elements at the operating frequency.

The sixth objective of the present disclosure is to provide a method of manufacturing electromagnetic wave reflecting structures that reduce the cost of deployment and maintenance.

The method of manufacturing electromagnetic wave reflecting structures of the present disclosure includes the steps of:

presetting an operating frequency, an incident wave pointing angle and an incident distance for an electromagnetic wave; presetting a plurality of reflected wave pointing angles; obtaining a plurality of electromagnetic wave reflecting structure phase distributions, each of which corresponds to a respective one of the reflected wave pointing angles, of the electromagnetic wave according to the operating frequency, the incident wave pointing angle, and the incident distance of the electromagnetic wave as well as the reflected wave pointing angles; converting the plurality of electromagnetic wave reflecting structure phase distributions of the electromagnetic wave into a plurality of electromagnetic wave reflecting structure phasor distributions, respectively; superposing the plurality of the electromagnetic wave reflecting structure phasor distributions and performing a conversion to obtain a synthetic electromagnetic wave reflecting structure phase distribution; and arranging a plurality of reflecting elements on a substrate according to the synthetic electromagnetic wave reflecting structure phase distribution and a reflecting element phase curve of any one of the reflecting elements at the operating frequency.

The seventh objective of the present disclosure is to provide an electromagnetic wave reflecting structure that reduces the cost of deployment and maintenance.

The electromagnetic wave reflecting structure is used for guiding multiple electromagnetic waves emitted from a plurality of electromagnetic wave sources to be reflected at a reflected wave pointing angle, wherein the electromagnetic waves has an operating frequency and each are incident at a respective incident wave pointing angle. The electromagnetic wave reflecting structure includes a substrate and a plurality of reflecting elements.

The substrate has a surface on which a reference point is defined. The plurality of reflecting elements are disposed on the surface. Aa synthetic reflection phase shift of the i-th reflecting element among the reflecting elements is related to a phasor superposition of a plurality of reflected phase shifts of the i-th reflecting element which correspond to the plurality of reflected wave pointing angles respectively. Each reflection phase shift of the i-th reflecting element is related to a coordinate location of the i-th reflecting element with respect to the reference point, a wave number at the operating frequency, a respective one of the reflected wave pointing angles, and an incident distance of the electromagnetic wave source to the i-th reflecting element. A size of the i-th reflecting element among the reflecting elements is related to the synthetic reflection phase shift of the i-th reflecting element on the substrate and a reflection phase of any one of the reflecting elements at the operating frequency.

According to the above technical features, the following effects can be achieved:

1. The manufacturing and deployment of the electromagnetic wave reflecting structure is cost-effective, and the electromagnetic wave reflecting structure does not consume power, requires no special maintenance and saves energy.
2. The electromagnetic wave reflecting structure does not consume power and can reflect the electromagnetic wave to eliminate the communication blind spots, thereby improving the signal coverage. When the electromagnetic wave reflecting structure is not used, there is no radiation of the electromagnetic wave. Besides, the electromagnetic wave reflecting structure is a low-profile plate, which occupies a small space and can be compatible with the decoration of a building.
3. Through the structure of the reflecting element, the reflecting element phase curve is smooth and the slope is not zero, so that the reflecting element can be used in any size within the size range corresponding to the operating frequency. The reflecting element phase curves of the reflecting elements in different frequency bands are in an equidistant state, so the reflecting element can be applied to a broad bandwidth.
4. By obtaining the synthetic electromagnetic wave reflection structure phase distribution, the electromagnetic wave reflection structure can be manufactured for single beam incident and multi-beam reflection or multi-beam incident and multi-beam reflection or multi-beam incident and single-beam reflection, thus can be used in a wide range of products.
5. By arranging the reflecting elements with different element structures on the substrate in a mixed manner, the energy intensity of the side lobes can be reduced more effectively, so that the reflection at the set reflected wave pointing angle has higher directivity compared with the conventional ways.

DETAILED DESCRIPTION OF THE PREFERRED EMBODIMENTS

Figure 1:
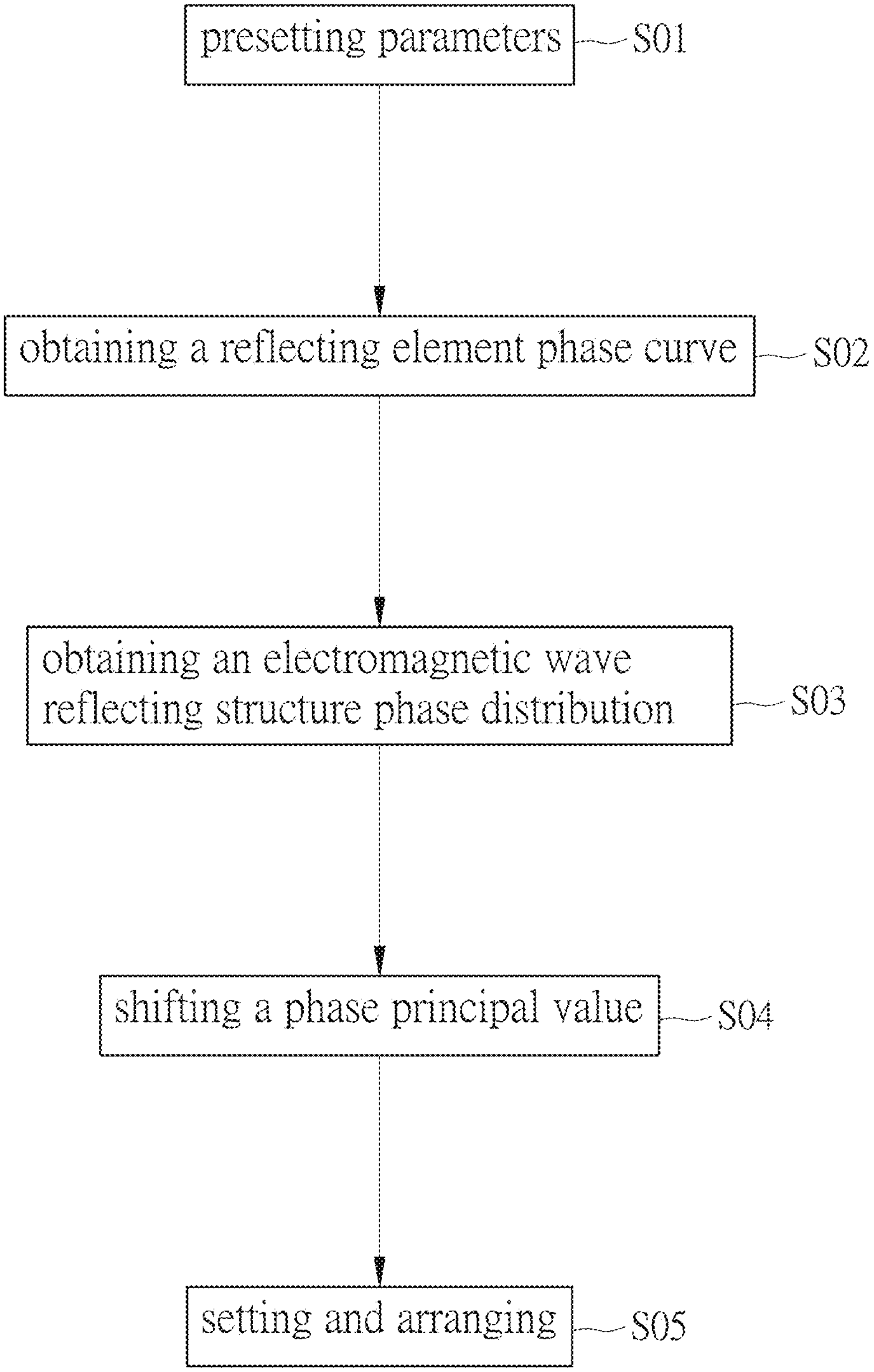
FIG. 1 is a flowchart illustrating a method of manufacturing an electromagnetic wave reflecting structure according to a first embodiment of the present disclosure.

Embodiments of the present disclosure will now be described, by way of example only, with reference to the accompanying drawings, wherein the same or similar reference numerals indicate the same or similar elements or elements with the same or similar functions.

Figure 2:
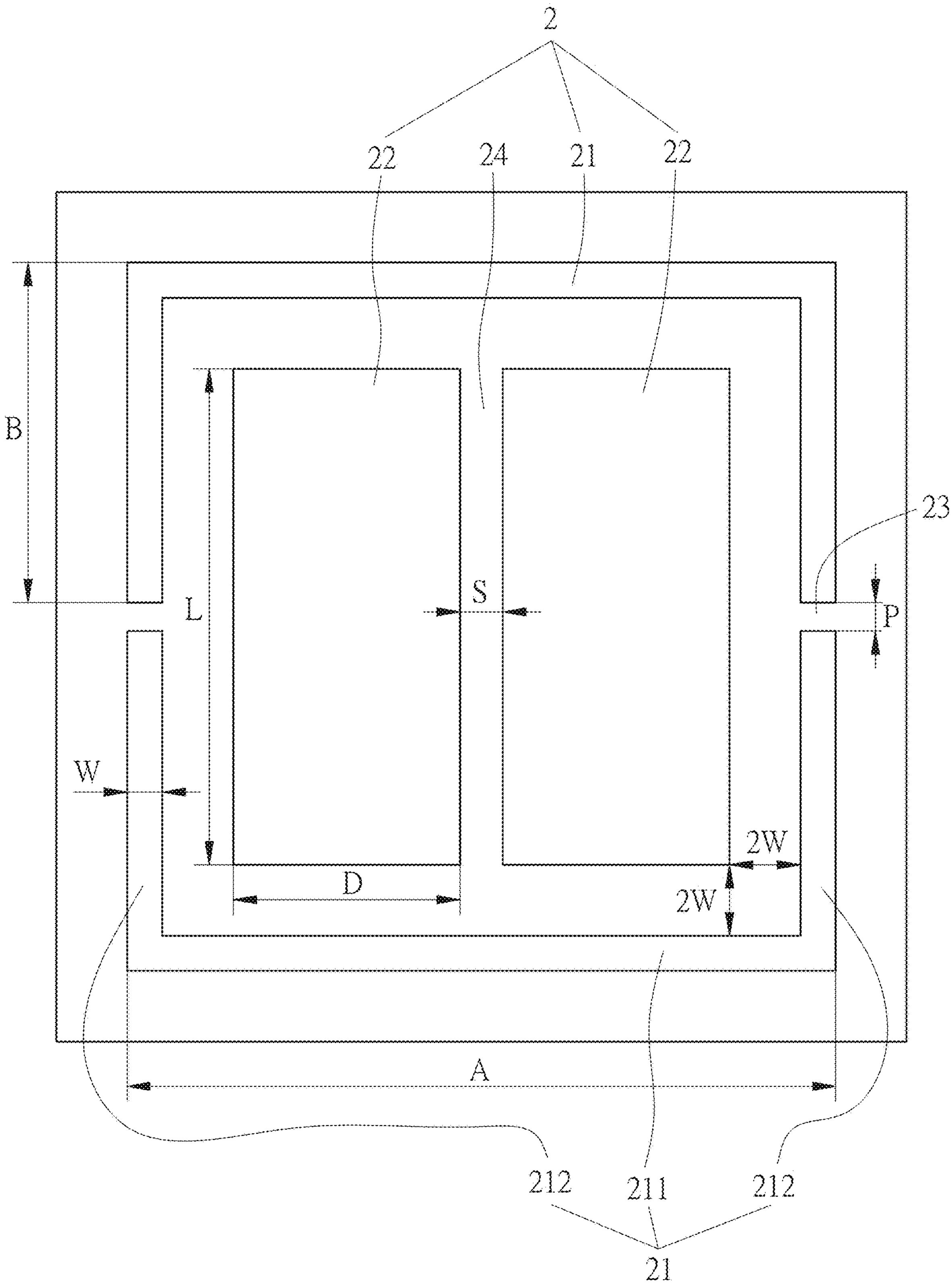
FIG. 2 is a schematic view illustrating the structure of a reflecting element of the first embodiment.
Figure 3:
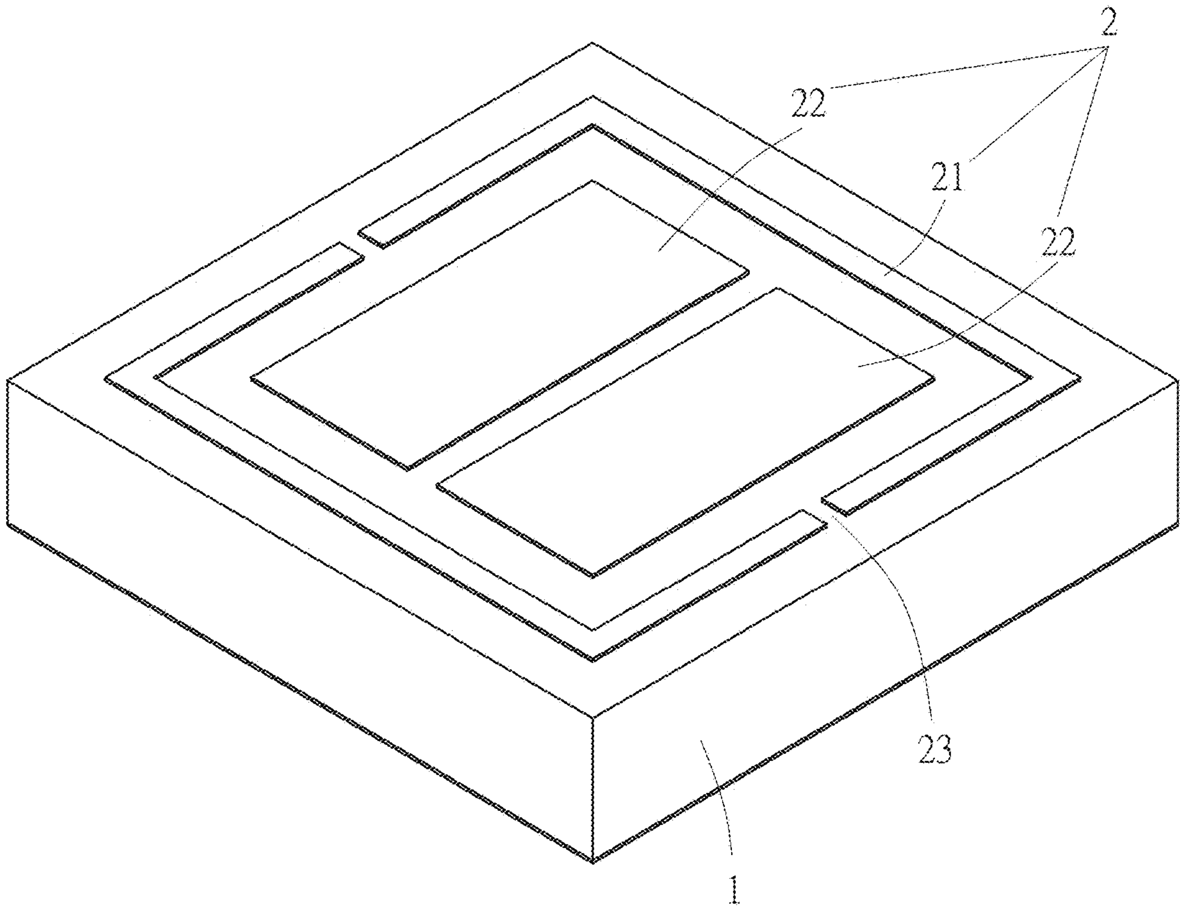
FIG. 3 is a perspective view illustrating the structure of the reflecting element of the first embodiment created by using a simulation software.

As shown in FIG. 1 through FIG. 3, a method of manufacturing an electromagnetic wave reflecting structure according to a first embodiment of the present disclosure comprises a step S01 of presetting parameters, a step S02 of obtaining a reflecting element phase curve, a step S03 of obtaining an electromagnetic wave reflecting structure phase distribution, a step S04 of shifting a phase principal value, and a step S05 of setting and arranging. An electromagnetic wave reflecting structure manufactured by the above-mentioned method comprises a substrate 1 and a plurality of reflecting elements 2.

Figure 9:
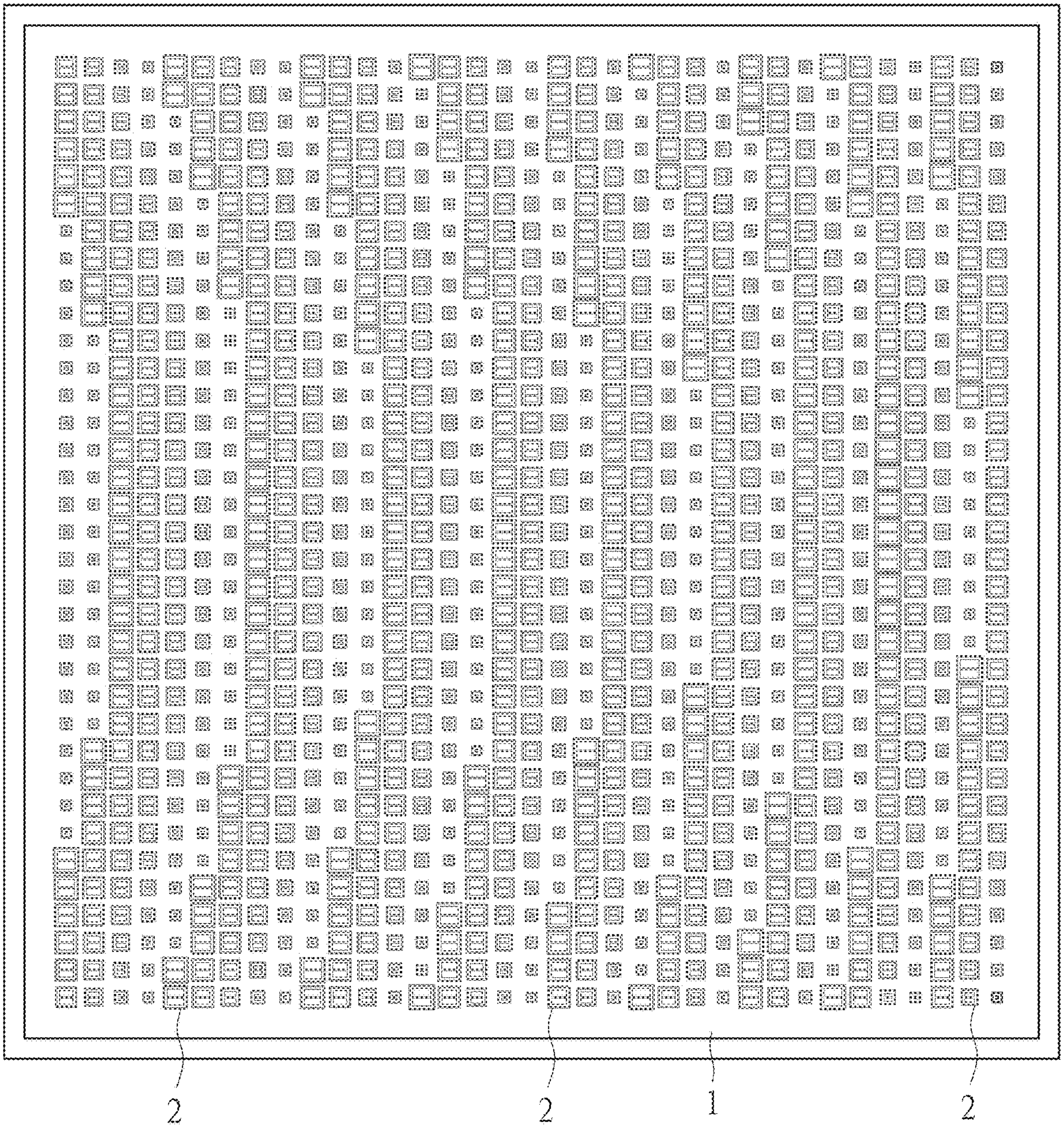
FIG. 9 is a schematic diagram illustrating the manufactured electromagnetic wave reflecting structure with the incident wave pointing angle at 0 degrees and the reflected wave pointing angle at −30 degrees.

Referring to FIG. 2, FIG. 3 and FIG. 9, the reflecting elements 2 are arranged on the substrate 1. The substrate 1 is substantially rectangular. In this embodiment, the substrate 1 is a high-frequency microwave laminated plate containing glass-reinforced hydrocarbon and ceramic material, and has a thickness of 1.524 mm. The electromagnetic wave reflecting structure further comprises a metal layer disposed on the bottom of the substrate 1. Each reflecting element 2 includes two first metal sheets 21 and two second metal sheets 22. Each first metal sheet 21 has a horseshoe shape, and includes an extension section 211 and two turning sections 212. The turning sections 212 are connected to two ends of the extension section 211 respectively and extend in a direction perpendicular to the extension section 211. The extension section 211 and the turning sections 212 of each first metal sheet 21 have substantially equal width W. The first metal sheets 21 are arranged facing each other to form a rectangle. A first spacing 23 is defined between the first metal sheets 21. Each second metal sheet 22 is substantially rectangular. The second metal sheets 22 are arranged side by side between the rectangle arranged by the first metal sheets 21. A second spacing 24 is defined between the second metal sheets 22. The size of each reflecting element 2 relates to the length L of any one of the second metal sheets 22. When the width P of the first spacing 23, the width S of the second spacing 24 and the width W of any one of the turning sections 212 remain fixed and the distance between any one of the second metal sheets 22 and the adjacent first metal sheet 21 is twice the width W of any one of the turning sections 212, the length A of any one of the extension sections 211 is substantially equal to the length of each second metal sheet 22 plus six times the width W of any one of the turning sections 212. The length B of each turning section 212 is substantially equal to one half of the length A of the extension section 211 minus the width P of the first spacing 23. The width D of each second metal sheet 22 is substantially equal to one half of the length as the length L of each second metal sheet 22 minus the width S of the second spacing 24. It is noted that the term "substantially equal" used herein refers to being within an acceptable manufacturing tolerance, ±5% for example.

Figure 4:
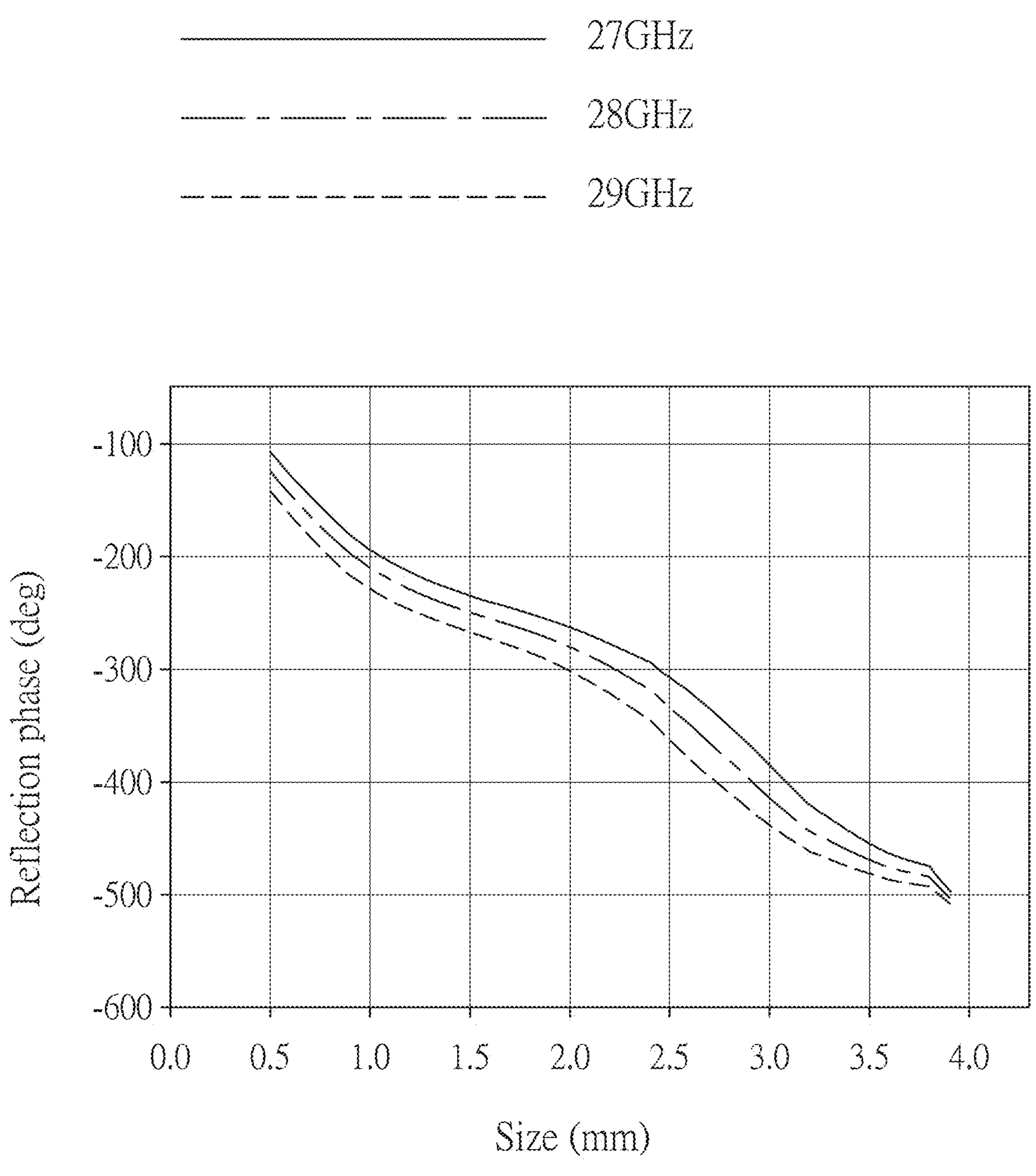
FIG. 4 is a simulation diagram illustrating multiple reflecting element phase curves when the reflecting element is in the 27 GHz, 28 GHz, and 29 GHz frequency bands.
Figure 5:
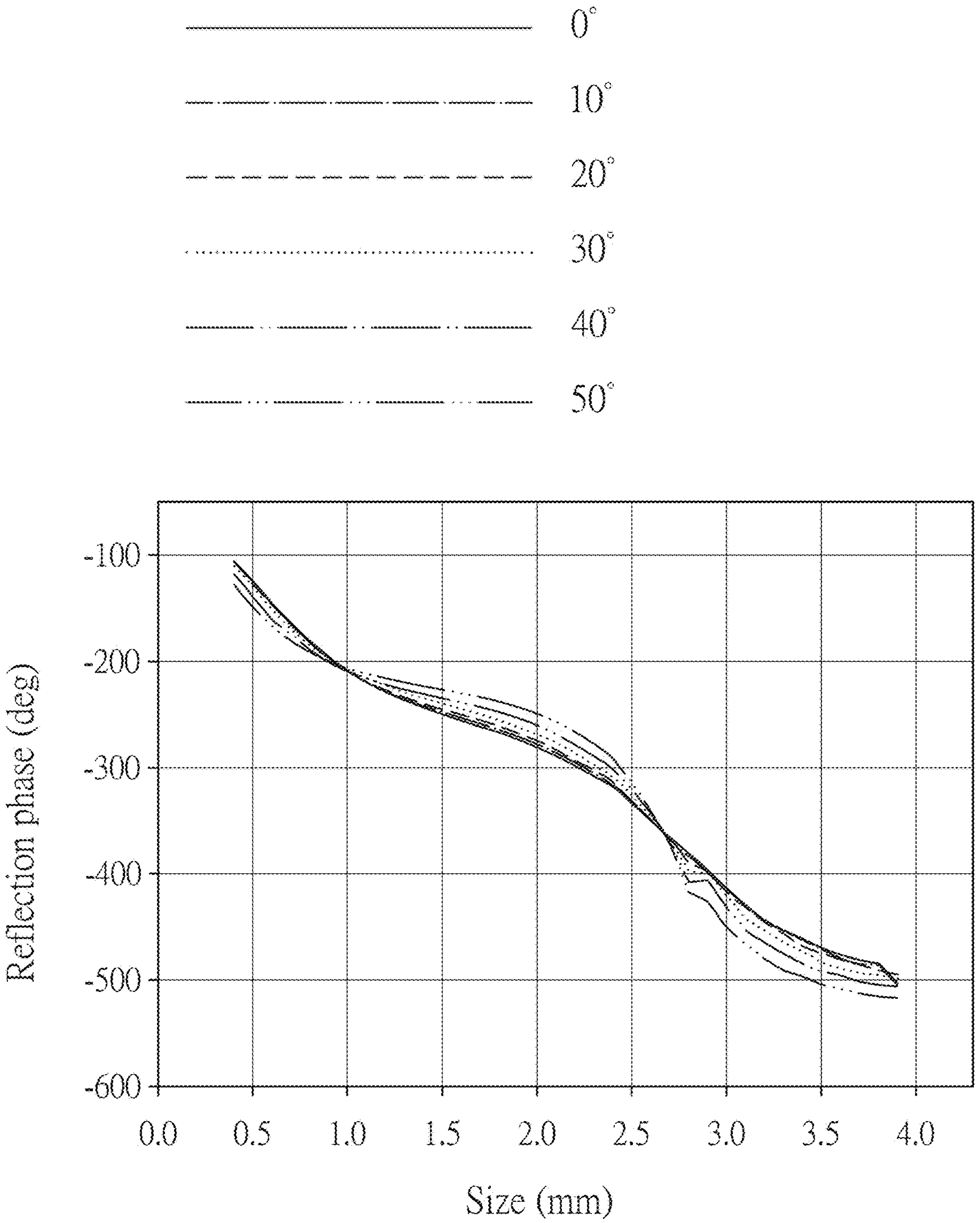
FIG. 5 is a simulation diagram illustrating multiple reflecting element phase curves of the reflecting element responsive to multiple incident wave pointing angles of 0 degrees, 10 degrees, 20 degrees, 30 degrees, 40 degrees, and 50 degrees.

As shown in FIG. 3 through FIG. 5, electromagnetic simulation software is used to create a model. The model sets one of the reflecting elements 2 on the substrate 1 corresponding in size to the reflecting element 2. It can be seen from the respective reflecting element phase curves of each reflecting element 2 in 27 GHz, 28 GHz and 29 GHz frequency bands, in the range of the size of each reflecting element 2 from 0.5 mm to 3.8 mm, the multiple curves displayed by the reflecting element phase curves are equidistant. The curves are smooth and the slope is not zero. Therefore, the applicable bandwidth of each reflecting element is at least 3 GHz. When an incident wave pointing angle of an electromagnetic wave is from 0 degrees to 50 degrees, the slopes of these curves are not zero. Therefore, any size of each reflecting element 2 ranging from 0.5 mm to 3.8 mm can correspond to a reflection phase.

Referring to FIG. 1 again, in the step S01 of presetting parameters, an operating frequency, a reflected wave pointing angle, an incident wave pointing angle, and an incident distance of the electromagnetic wave are preset. In this embodiment, the reflected wave pointing angle is the included angle between a normal vector of the electromagnetic wave reflecting structure and the reflected electromagnetic wave. The incident wave pointing angle is the included angle between a normal vector of the electromagnetic wave reflecting structure and the incident electromagnetic wave. When the incident wave pointing angle is 0 degrees, the reflected wave pointing angle is between −60 degrees and 60 degrees. In this embodiment, the reflected wave pointing angle is −30 degrees, and the operating frequency is a 5G mobile communication electromagnetic wave. The 28 GHz frequency band is taken as an example for illustration, but it is not limited to this.

Referring to FIG. 1, FIG. 3 and FIG. 4, in the step S02 of obtaining a reflecting element phase curve, the electromagnetic simulation software is used to create the model of the reflecting element 2 set on the substrate 1 corresponding in size to the reflecting element 2, and to simulate a phase distribution of the model according to the incident wave pointing angle and the operating frequency, and to obtain the reflecting element phase curve of any one of the reflecting elements 2. Wherein, a reflection phase of any reflecting element phase curve varies with the size L.

Figure 6:
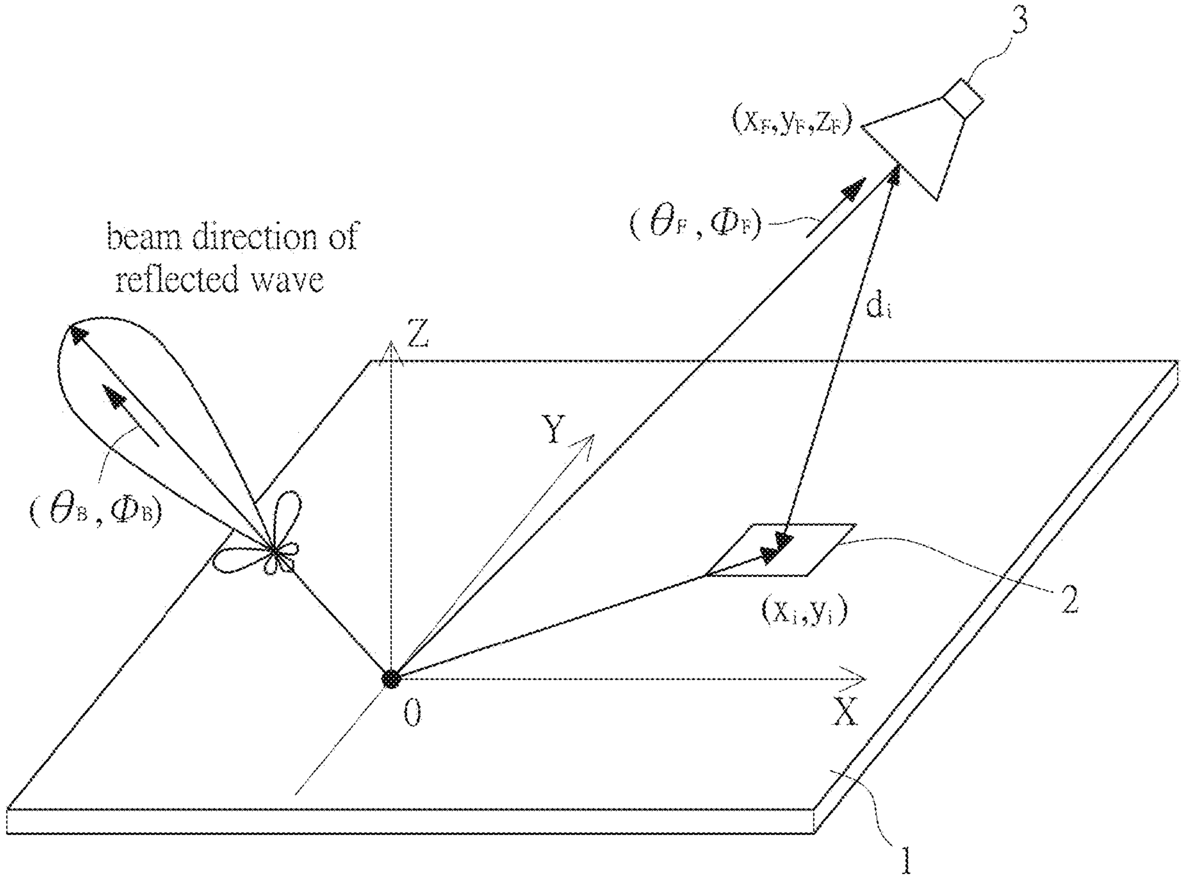
FIG. 6 is a schematic diagram illustrating a feeding antenna transmitting an electromagnetic wave to an electromagnetic wave reflecting structure.
Figure 7:
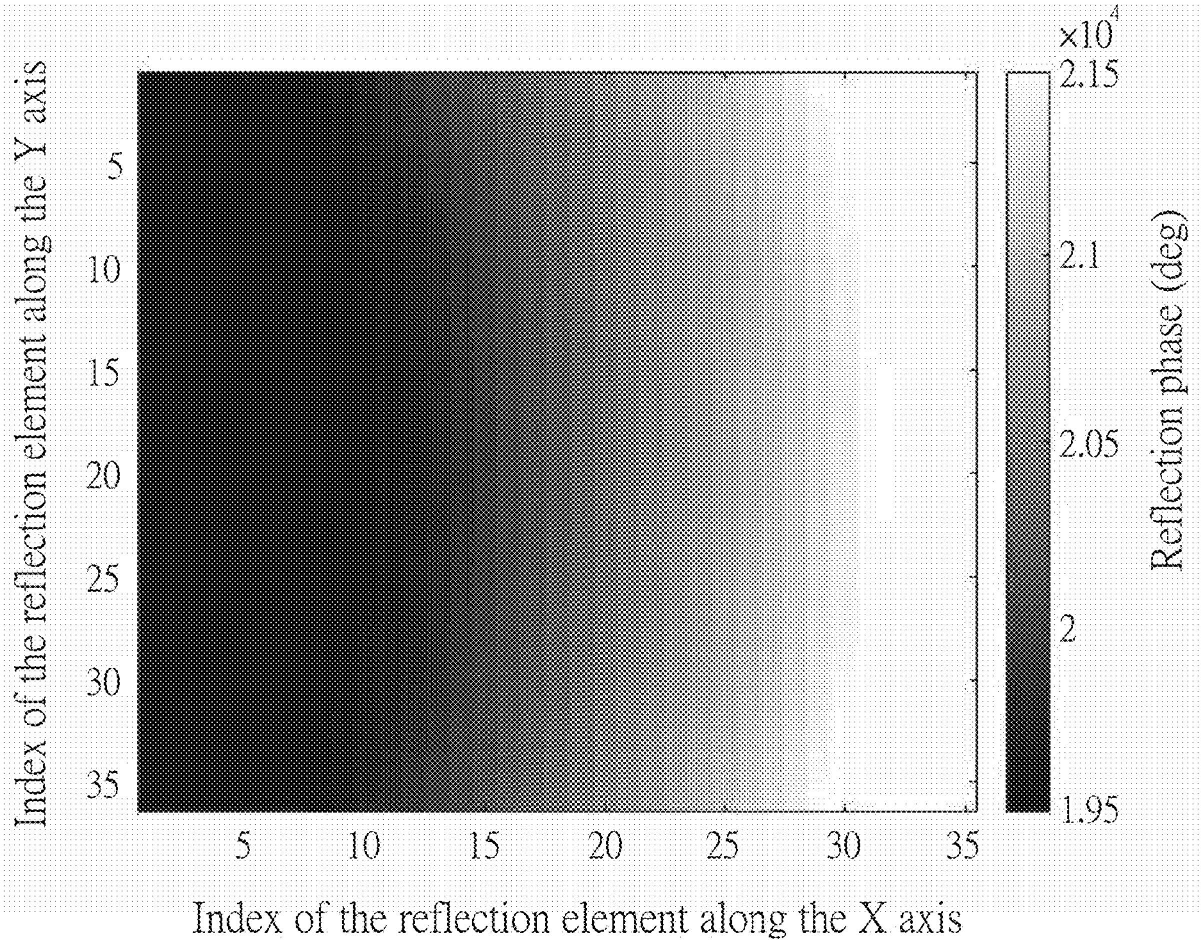
FIG. 7 is a simulation diagram illustrating an electromagnetic wave reflecting structure phase distribution of the electromagnetic wave reflecting structure.

Referring to FIG. 1, FIG. 6 and FIG. 7, in the step S03 of obtaining an electromagnetic wave reflecting structure phase distribution, an electromagnetic wave reflecting structure phase distribution of the electromagnetic wave reflecting structure is obtained according to the operating frequency, the reflected wave pointing angle, the incident wave pointing angle, and the incident distance. The operating frequency, the reflected wave pointing angle, the incident wave pointing angle, and the incident distance are put into the following formulas.

$$\Phi_R(x_i,y_i)=k[d_i-(x_i\cos\Phi_B+y_i\sin\Phi_B)\sin\theta_B]\pm 2N\pi \quad (1)$$

$$d_i=[(x_F-x_i)^2+(y_F-y_i)^2+z_F^2]^{0.5} \quad (2)$$

Referring to FIG. 6, $(x_i, y_i)$ is a coordinate location of the i-th reflecting element 2 relative to a reference point, $\Phi_R(x_i, y_i)$ is a reflection phase shift of the i-th reflecting element 2, k is a wave number at the operating frequency, $(\theta_B, \Phi_B)$ is a reflected wave pointing angle and presented in a spherical coordinate system, $d_i$ is the incident distance of the center of the incident electromagnetic wave to the i-th reflecting element, $(x_F, y_F, z_F)$ is a spatial coordinate location of an electromagnetic wave source of the electromagnetic wave relative to the reference point, $(\theta_F, \Phi_F)$ is the incident wave pointing angle and is also presented in the spherical coordinate system, and N is a nature number. In the design process of this embodiment, the incident wave pointing angle $\Phi_B$ is first set to 0, and the electromagnetic wave reflecting structure is set in the air. The operating frequency wave number is set as the operating frequency wave number in vacuum. Wherein, as shown in FIG. 6, a feed antenna 3 represents the electromagnetic wave source.

The electromagnetic wave reflecting structure phase distribution is obtained according to the above formulas.

Figure 8:
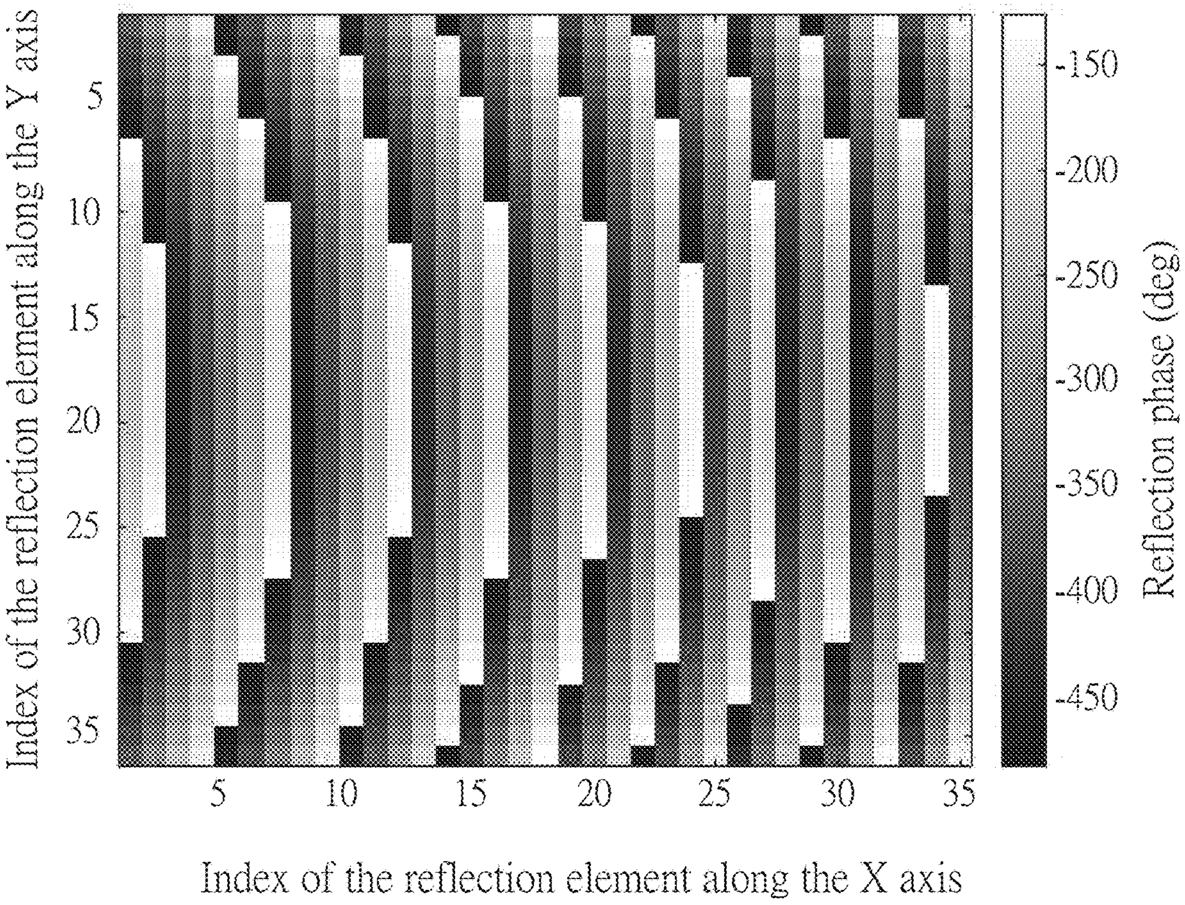
FIG. 8 is a simulation diagram illustrating that the electromagnetic wave reflecting structure phase distribution is performed with a principal value process.

Referring to FIG. 4, FIG. 7 and FIG. 8, in the step S04 of shifting a phase principal value (FIG. 1), the electromagnetic wave reflecting structure phase distribution corresponds to the reflecting element phase curve of any one of the reflecting elements 2 in the 28 GHz frequency band. The detailed method is to perform a principal value process on a plurality of reflection phase shifts of the electromagnetic wave reflecting structure phase distribution according to a phase period interval. The principal value process is to take a principal value of each reflection phase shift within the phase period interval. That is, each reflection phase shift is subtracted 2Nπ from itself, and the principal value within the phase period interval is retained. In this embodiment, the phase period interval is −180 degrees to 180 degrees. Then, the electromagnetic wave reflecting structure phase distribution after the principal value process shifts to correspond to the range of the size corresponding to the range of the reflection phase of any one of the reflecting elements 2 at the operating frequency. For example, the reflection phase shifts between −180 degrees and 180 degrees of the electromagnetic wave reflecting structure phase distribution after the principal value process are shifted to the range between −460 degrees and −100 degrees of the reflection phase of any one of the reflecting elements 2, and then correspond to the range of the size L. Wherein, one color of each block in FIG. 8 corresponds to the size L of any one of the reflecting elements.

Referring to FIG. 4, FIG. 8 and FIG. 9, in the step S05 of setting and arranging (FIG. 1), the reflecting elements 2 are arranged on the substrate 1 according to the electromagnetic wave reflecting structure phase distribution corresponding to the reflecting element reflection phase curve of any one of the reflecting elements 2 at the operating frequency. That is, according to the shift of the electromagnetic wave reflecting structure phase distribution after the principal value process corresponding to the range of the size corresponding to the range of the reflection phase of any one of the reflecting elements 2 at the operating frequency, the reflecting elements 2 of different sizes L are arranged on the substrate 1.

Figure 10:
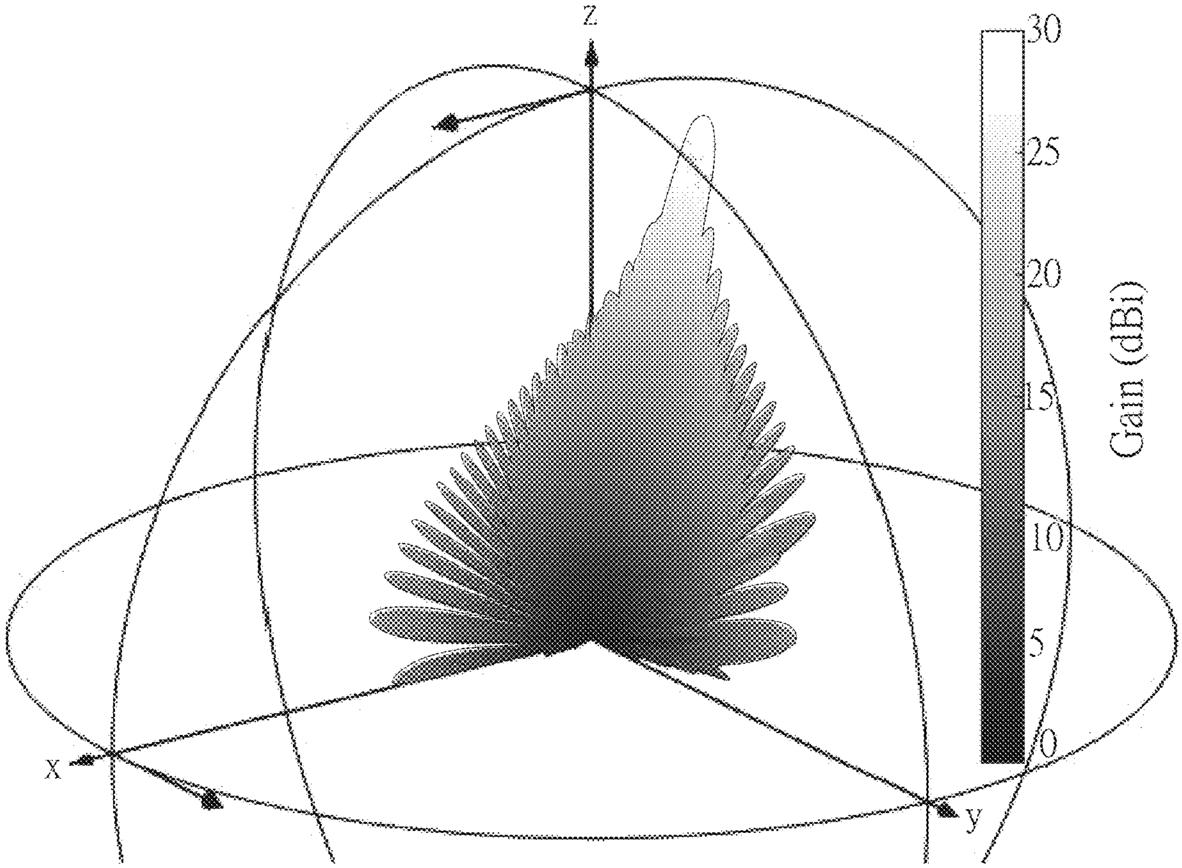
FIG. 10 is a simulation diagram illustrating a three-dimensional radiation pattern of the electromagnetic wave reflecting structure.
Figure 11:
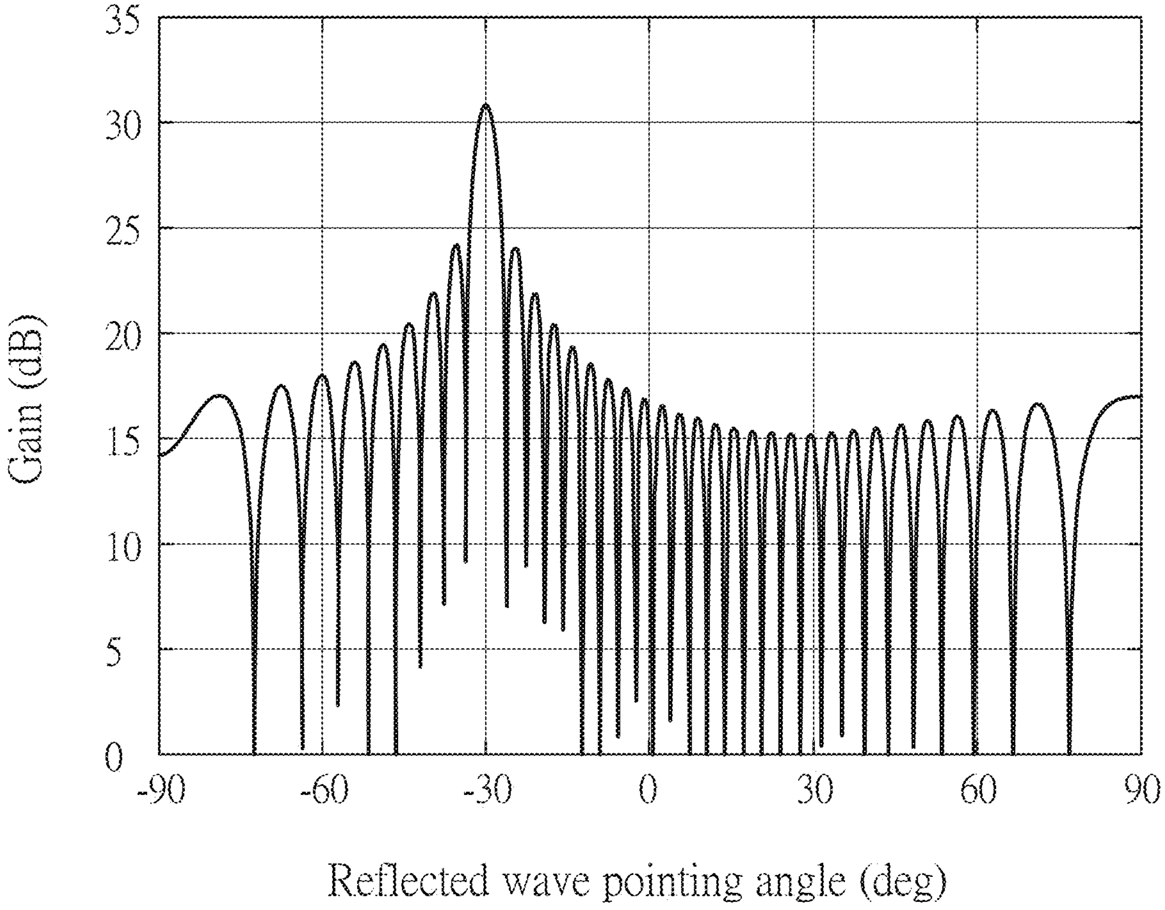
FIG. 11 is a simulation diagram illustrating a two-dimensional radiation pattern of the electromagnetic wave reflecting structure.

FIG. 10 and FIG. 11 are a three-dimensional radiation pattern and a two-dimensional cross-sectional radiation pattern simulated by the electromagnetic simulation software of the electromagnetic wave reflecting structure designed according to the above steps. It can be seen from the diagrams that the gain performance is good when the reflected wave pointing angle is −30 degrees; that is, the incident wave can be effectively reflected at the reflected wave pointing angle of −30 degrees by the electromagnetic wave reflecting structure.

Figure 12:
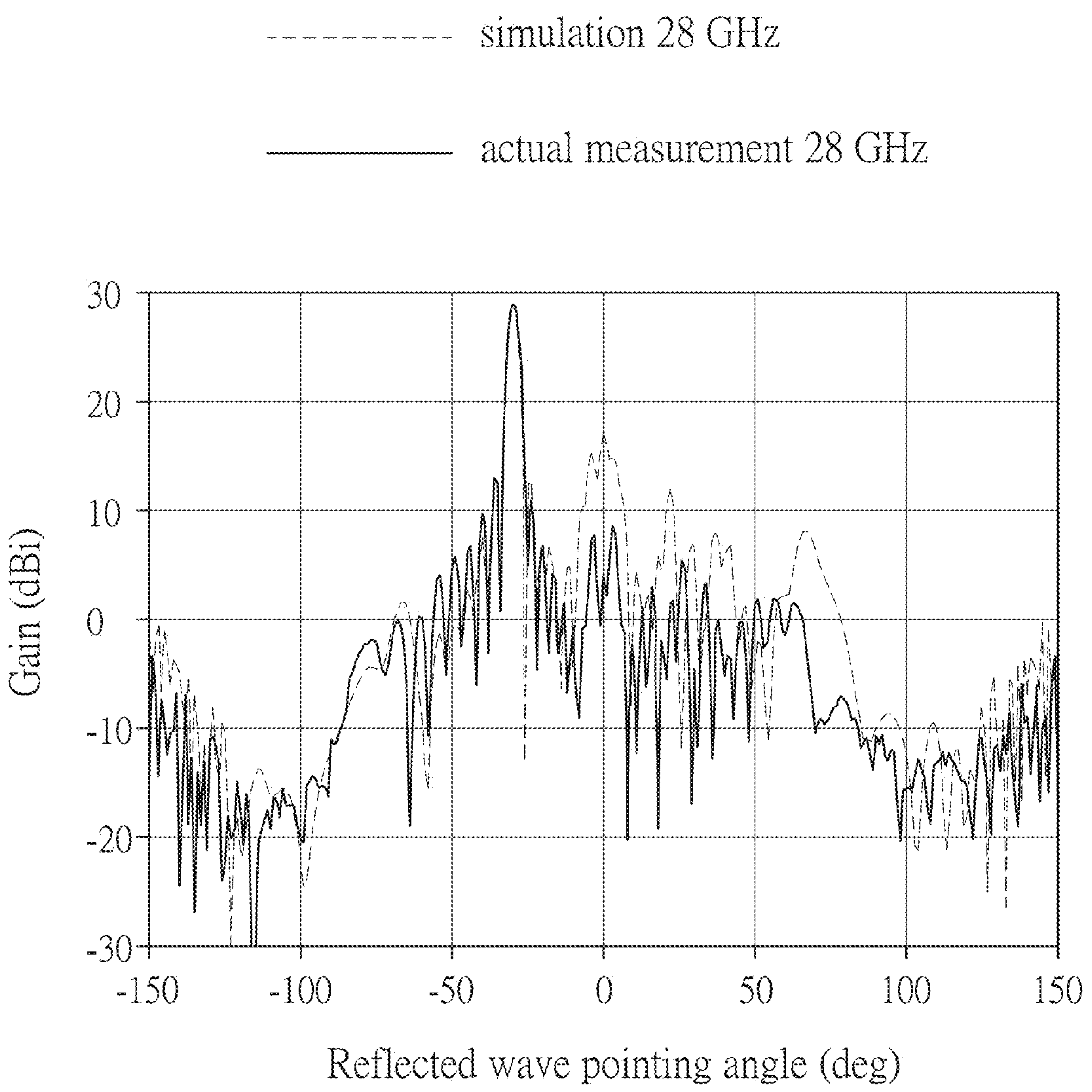
FIG. 12 is a measurement and simulation diagram illustrating the change of a gain and the reflected wave pointing angle of the electromagnetic wave reflecting structure.

Please refer to FIG. 12, which shows the changes of the gain and the reflected wave pointing angle of the actual measurement and the simulation of the electromagnetic wave reflecting structure designed according to the above steps. It can be seen from the diagram that the measured result and the simulation have good gains in the 28 GHz frequency band when the reflected wave pointing angle is −30 degrees, and the simulation result is very close to the actual measurement result.

Figure 13:
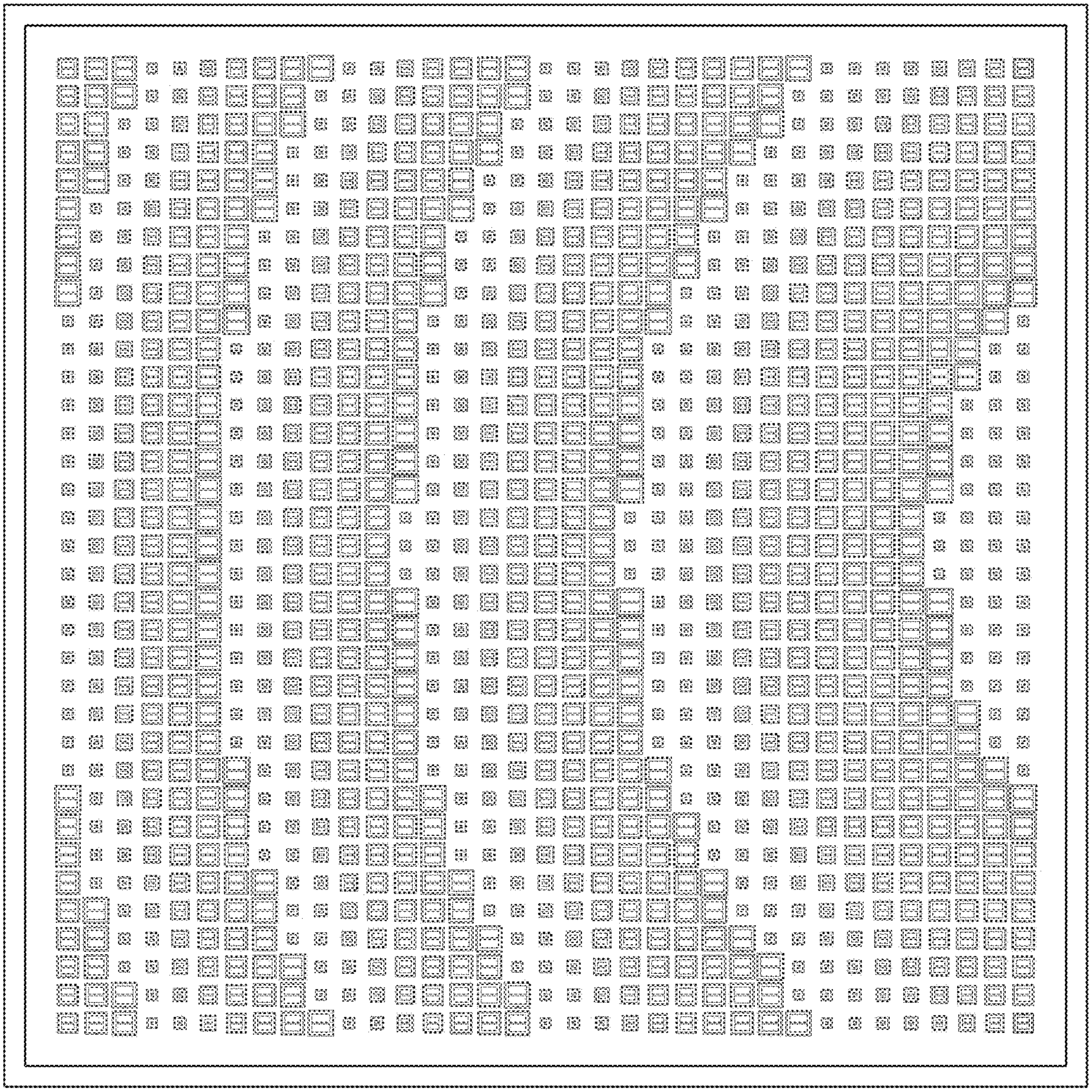
FIG. 13 is a schematic diagram illustrating the manufactured electromagnetic wave reflecting structure with the incident wave pointing angle at 30 degrees and the reflected wave pointing angle at −15 degrees.
Figure 14:
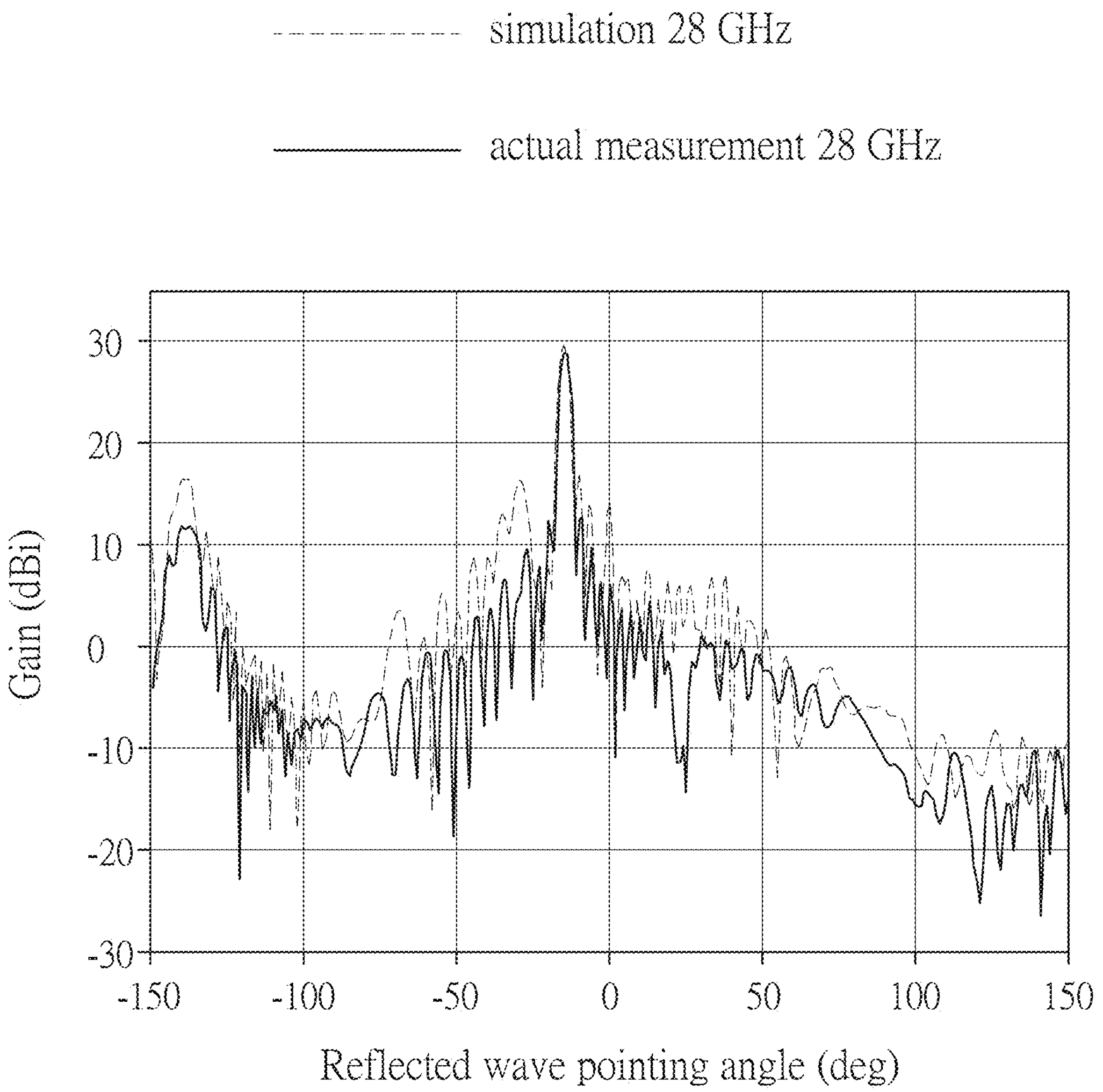
FIG. 14 is a measurement and simulation diagram illustrating the change of the gain and the reflected wave pointing angle of the electromagnetic wave reflecting structure.

FIG. 13 illustrates the electromagnetic wave reflecting structure designed according to the above steps when the incident wave pointing angle is 30 degrees and the reflected wave pointing angle is −15 degrees in the 28 GHz frequency band. FIG. 14 illustrates the changes of the gain and the reflected wave pointing angle of the actual measurement and the simulation. It can be seen from the diagram that it has a good gain when the reflected wave pointing angle is −15 degrees, and the simulation result is also very close to the actual measurement result.

Figure 15:
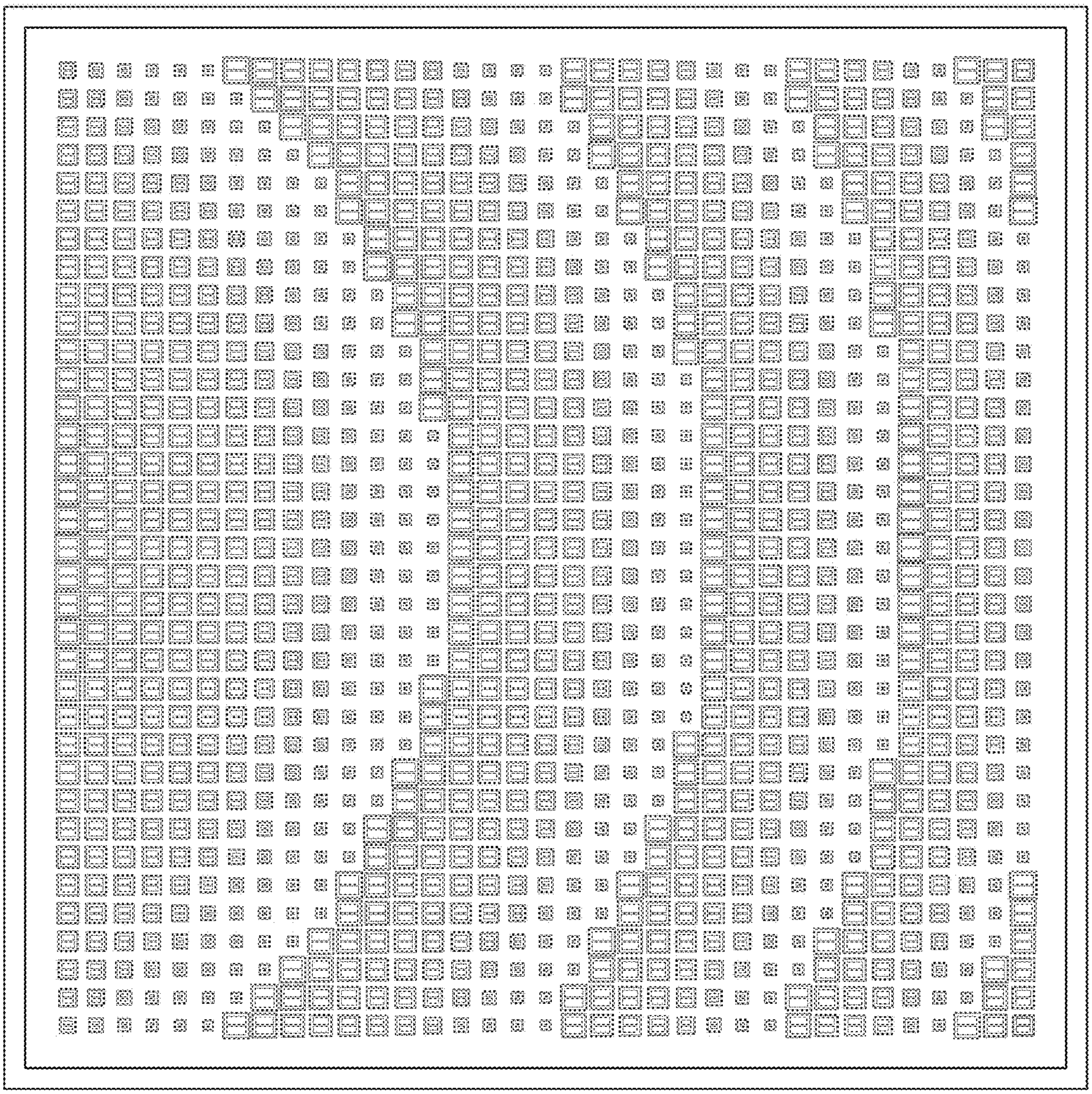
FIG. 15 is a schematic diagram illustrating the manufactured electromagnetic wave reflecting structure with the incident wave pointing angle at 30 degrees and the reflected wave pointing angle at −45 degrees.
Figure 16:
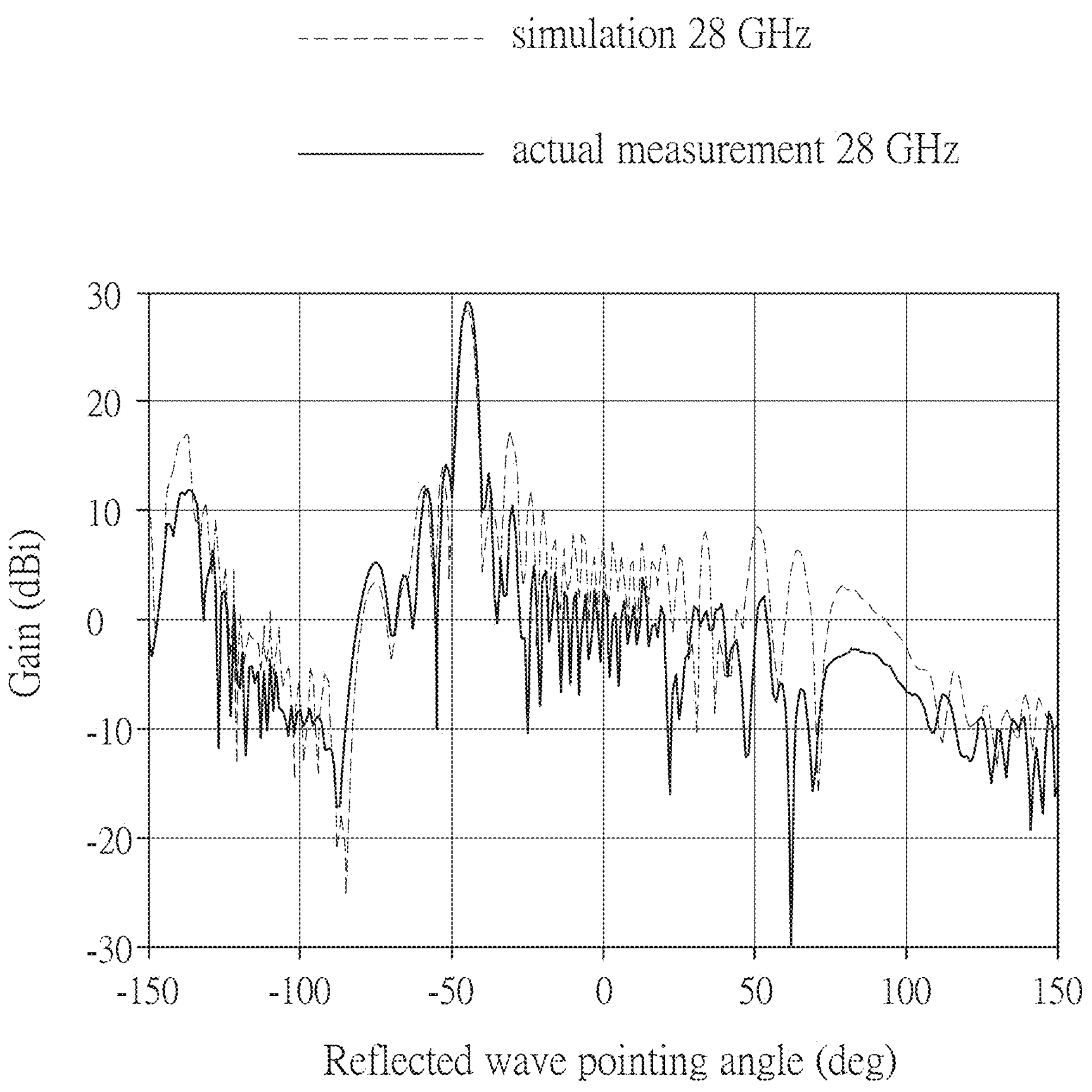
FIG. 16 is a measurement and simulation diagram illustrating the change of the gain and the reflected wave pointing angle of the electromagnetic wave reflecting structure.

FIG. 15 illustrates the electromagnetic wave reflecting structure designed according to the above steps when the incident wave pointing angle is 30 degrees and the reflected wave pointing angle is −45 degrees in the 28 GHz frequency band. FIG. 16 illustrates the changes of the gain and the reflected wave pointing angle of the actual measurement and the simulation. It can be seen from the diagram that it has a good gain when the reflected wave pointing angle is −45 degrees, and the simulation result is also very close to the actual measurement result.

Figure 17:
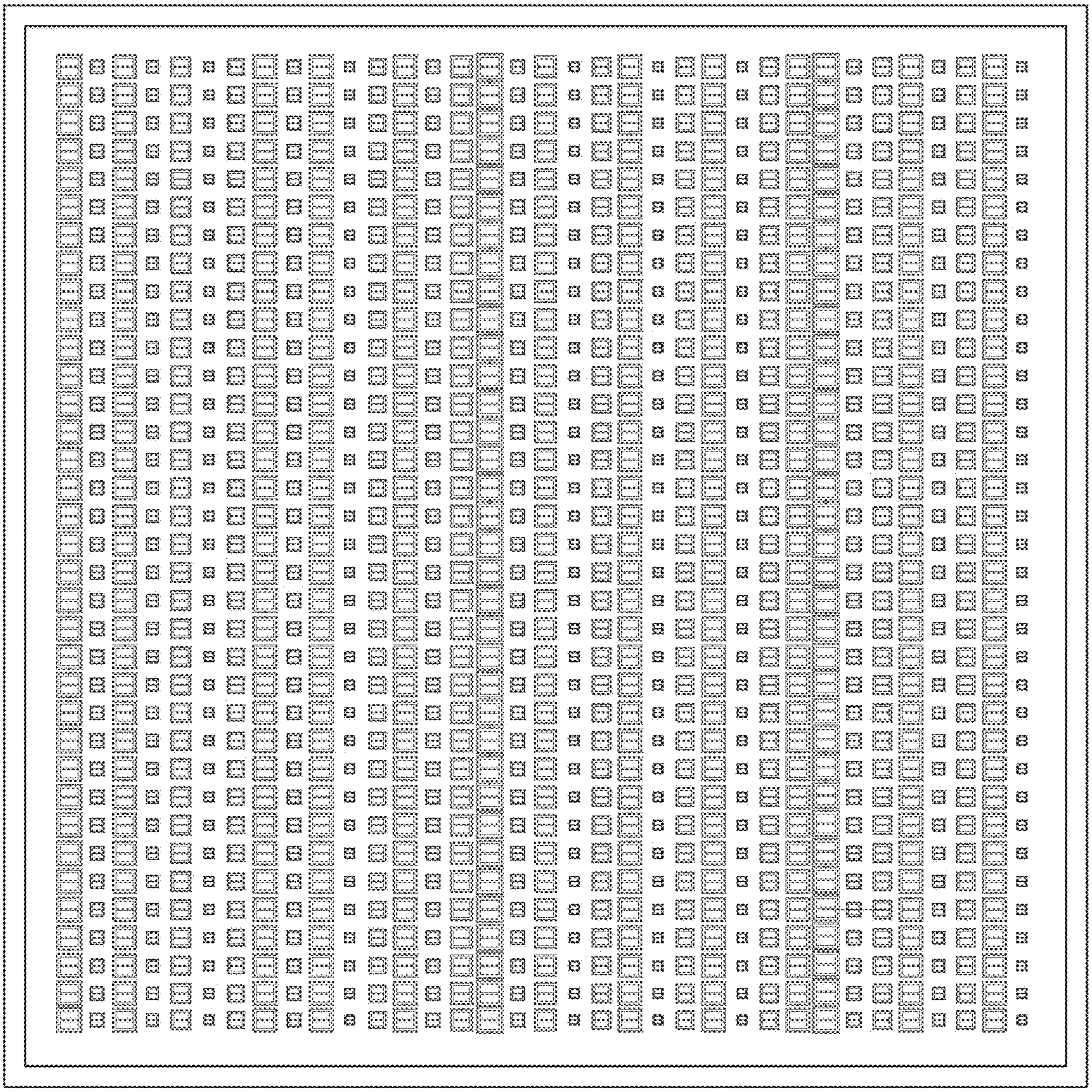
FIG. 17 is a schematic diagram illustrating the manufactured electromagnetic wave reflecting structure with the incident wave pointing angle at 30 degrees and the reflected wave pointing angle at −45 degrees.
Figure 18:
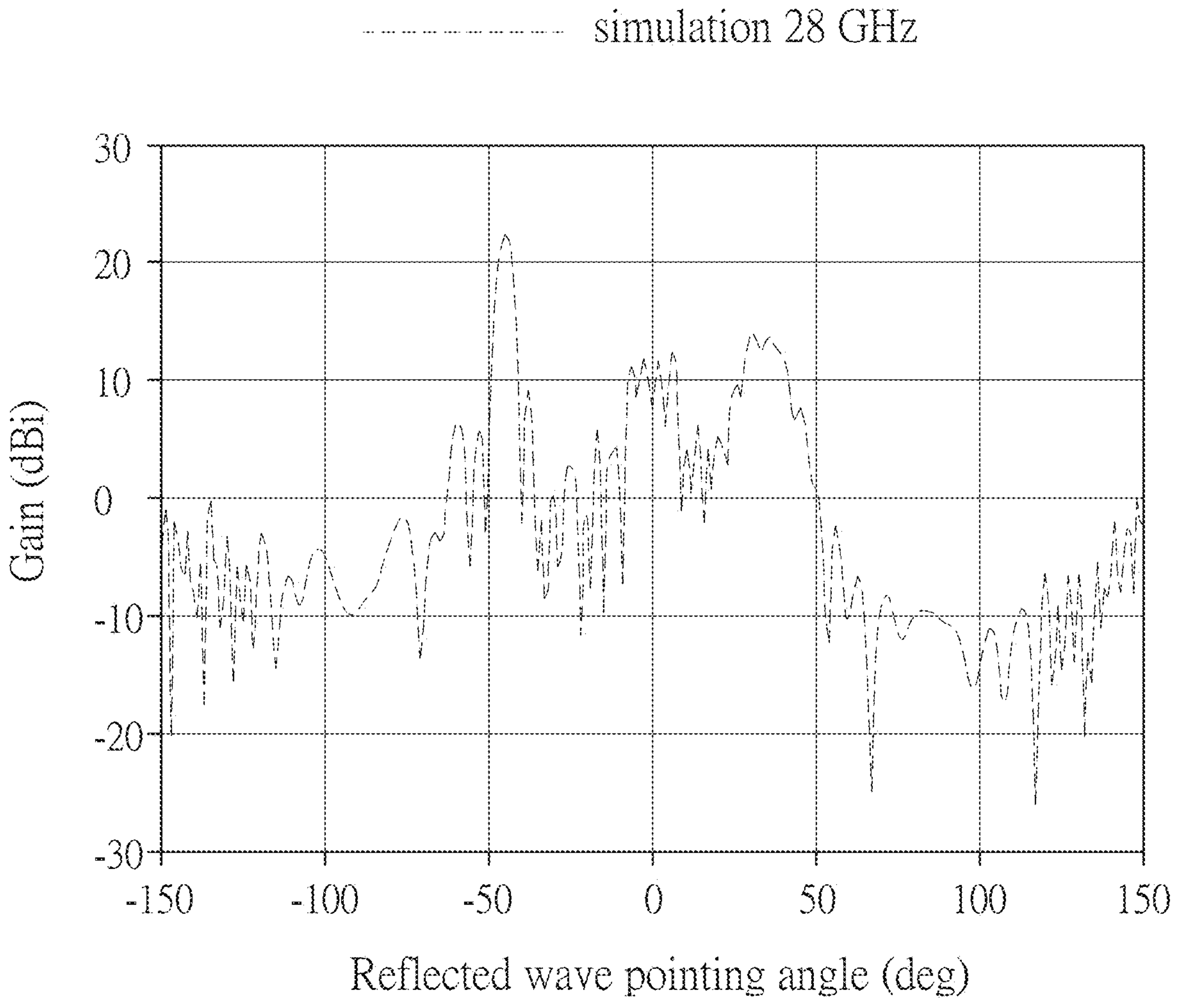
FIG. 18 is a simulation diagram illustrating the change of the gain and the reflected wave pointing angle of the electromagnetic wave reflecting structure.

FIG. 17 illustrates the electromagnetic wave reflecting structure designed according to the above steps when the incident wave pointing angle is 0 degrees and the reflected wave pointing angle is −45 degrees in the 28 GHz frequency band. FIG. 18 illustrates the change of the gain and the reflected wave pointing angle of the simulation. It can be seen from the diagram that it has a good gain when the reflected wave pointing angle is −45 degrees.

Figure 19:
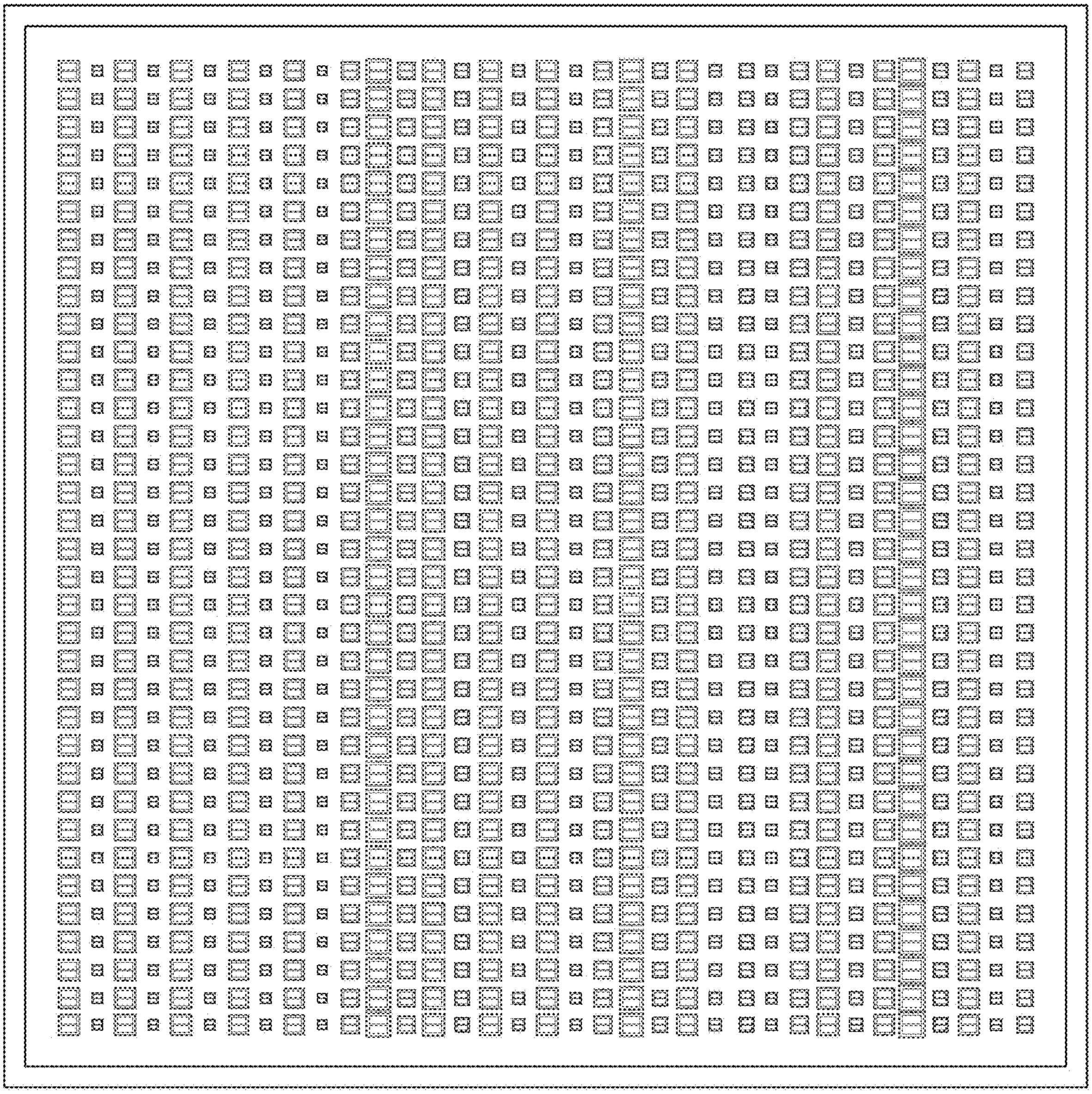
FIG. 19 is a schematic diagram illustrating the manufactured electromagnetic wave reflecting structure with the incident wave pointing angle at 0 degrees and the reflected wave pointing angle at −60 degrees.
Figure 20:
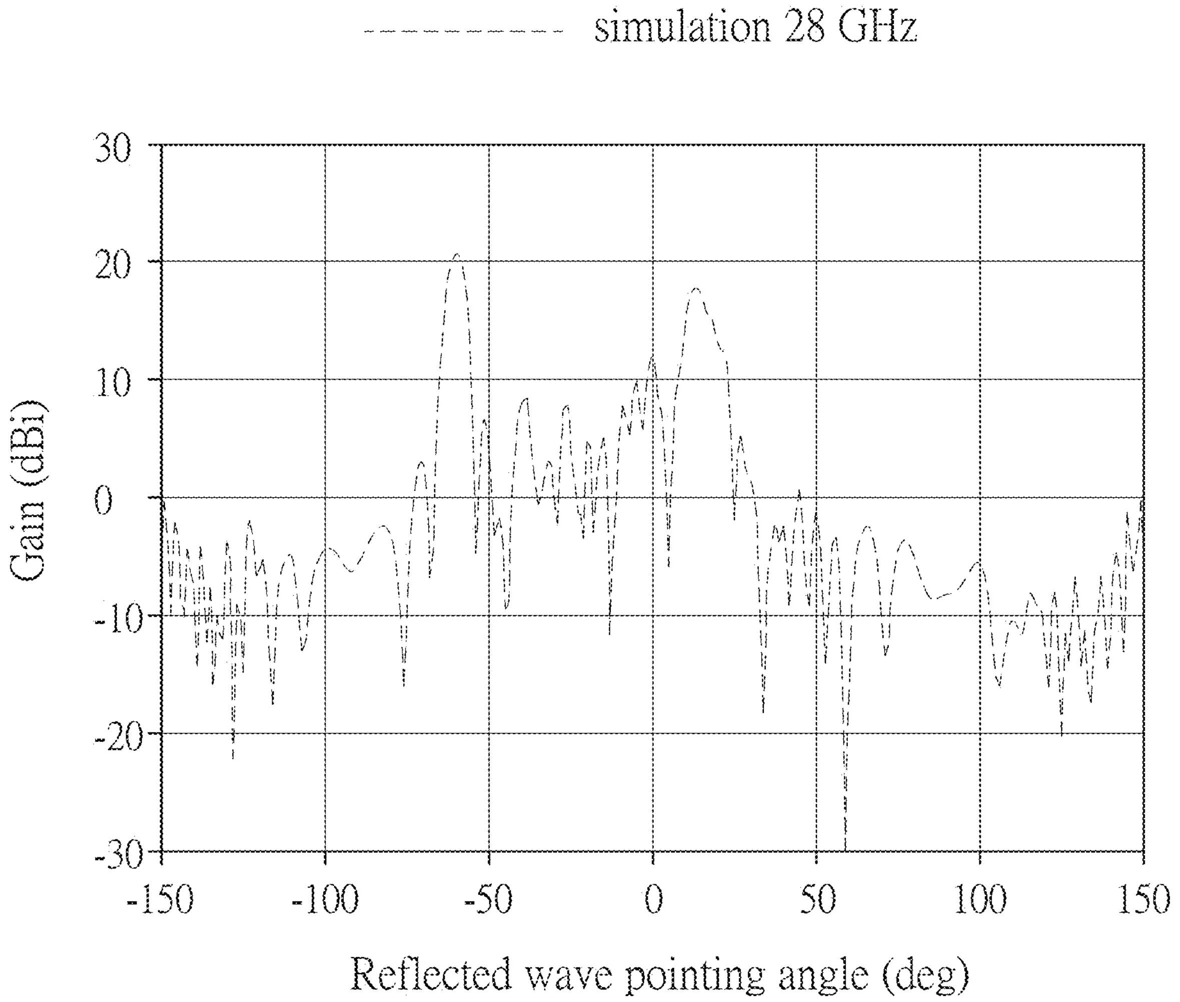
FIG. 20 is a simulation diagram illustrating the change of the gain and the reflected wave pointing angle of the electromagnetic wave reflecting structure.

FIG. 19 illustrates the electromagnetic wave reflecting structure designed according to the above steps when the incident wave pointing angle is 0 degrees and the reflected wave pointing angle is −60 degrees in the 28 GHz frequency band. FIG. 20 illustrates the change of the gain and the reflected wave pointing angle of the simulation. It can be seen from the diagram that it has a good gain when the reflected wave pointing angle is −60 degrees.

Figure 21:
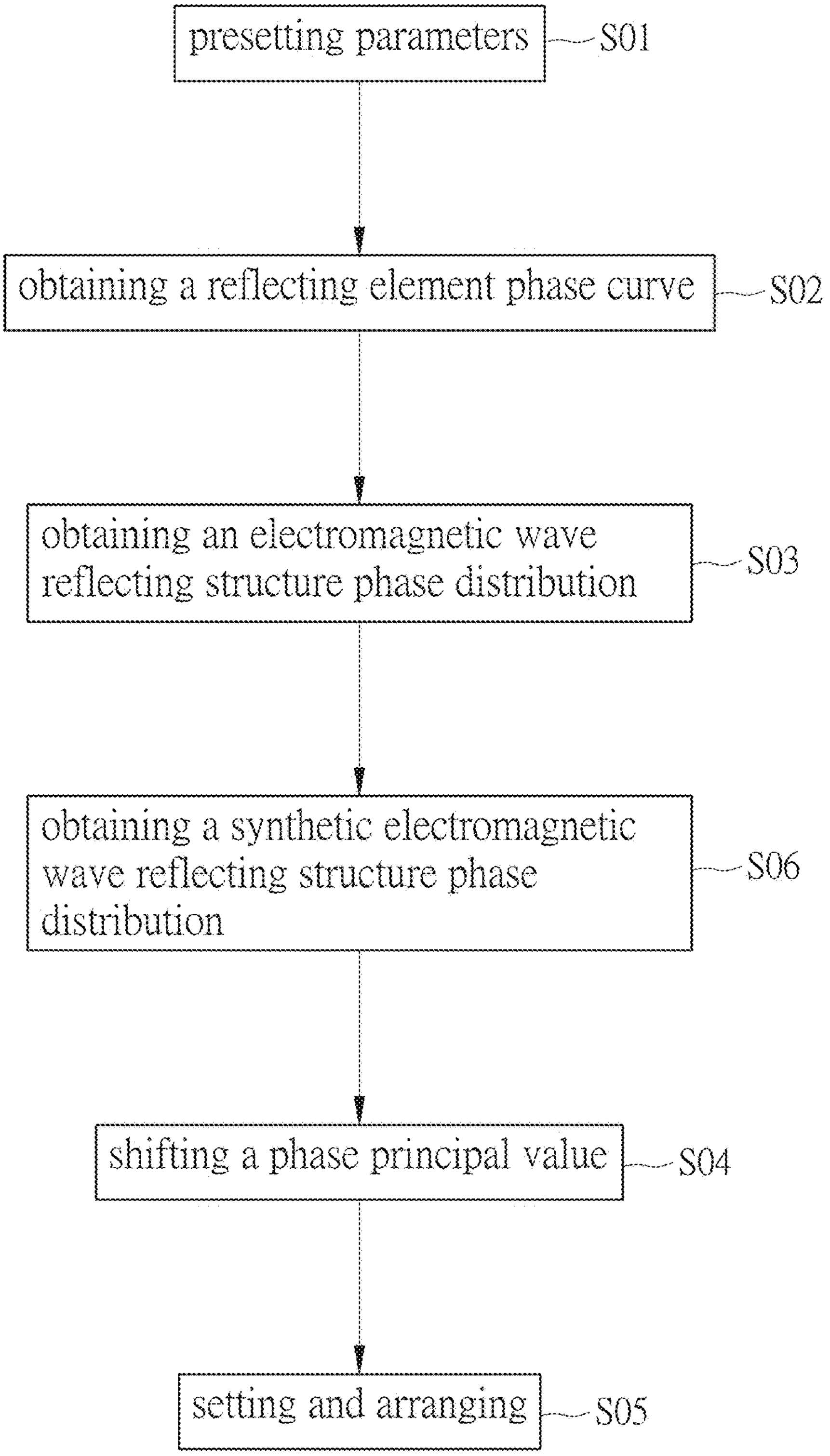
FIG. 21 is a flowchart illustrating a method of manufacturing an electromagnetic wave reflecting structure according to a second embodiment of the present disclosure.
Figure 22:
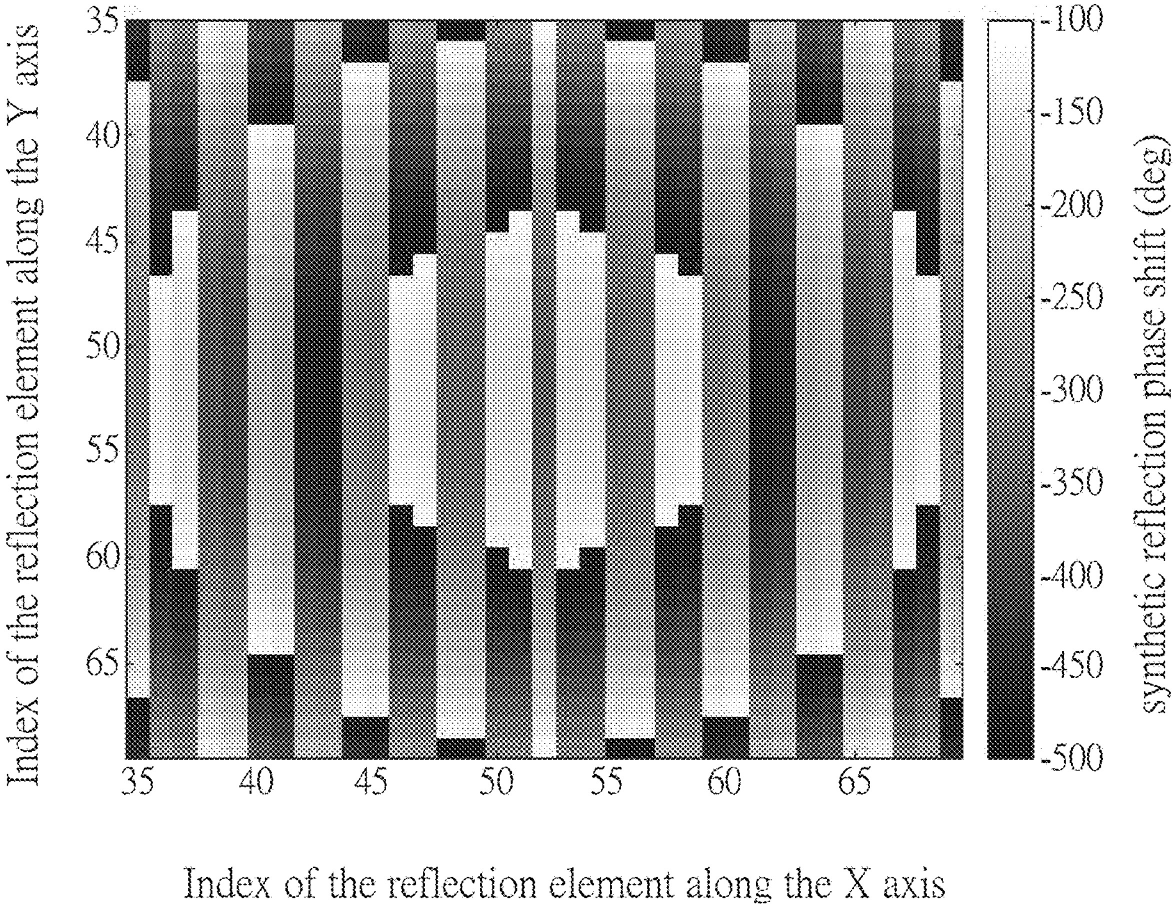
FIG. 22 is a simulation diagram illustrating that the electromagnetic wave reflecting structure phase distribution is performed with the principal value process.

FIG. 21 and FIG. 22 illustrate a method of manufacturing an electromagnetic wave reflecting structure according to a second embodiment of the present disclosure. In order to meet more complex environmental requirements, for example, in the environment where only one signal source is incident but there are two communication blind spots in the vicinity, the electromagnetic wave reflecting structure for single beam incident and multi-beam reflection can eliminate two communication blind spots with a single structure and improve the signal coverage. The second embodiment is substantially similar to the first embodiment, except that the method further comprises a step S06 of obtaining a synthetic electromagnetic wave reflecting structure phase distribution. The step S06 of obtaining a synthetic electromagnetic wave reflecting structure phase distribution is between the step S03 of obtaining an electromagnetic wave reflecting structure phase distribution and the step S04 of shifting a phase principal value.

In the step S01 of presetting parameters, the operating frequency, a plurality of reflected wave pointing angles, the incident wave pointing angle, and the incident distance corresponding to the electromagnetic wave are preset. In this embodiment, the electromagnetic wave is preset in the 28 GHz frequency band, and there are two reflected wave pointing angles. One reflected wave pointing angle is 30 degrees, and the other reflected wave pointing angle is −30 degrees. The incident wave pointing angle is 0 degrees, and the incident distance is infinite.

In the step S03 of obtaining an electromagnetic wave reflecting structure phase distribution, the electromagnetic wave reflecting structure phase distribution of each electromagnetic wave reflecting structure is obtained according to the operating frequency, each reflected wave pointing angle, the incident wave pointing angle, and the incident distance of the electromagnetic wave. Each reflected wave pointing angle, the incident wave pointing angle, the incident distance, and the spatial coordinate location of the electromagnetic wave source relative to the reference point are put into the formulas (1) and (2).

In the step S06 of obtaining a synthetic electromagnetic wave reflecting structure phase distribution, the electromagnetic wave reflecting structure phase distributions of the electromagnetic wave reflecting structures are converted into multiple electromagnetic wave reflecting structure phasor distributions, and the electromagnetic wave reflecting structure phasor distributions are performed with a phasor superposition and a conversion to obtain a synthetic electromagnetic wave reflecting structure phase distribution. Wherein, the conversion is to convert a synthetic phasor form into a phase form through mathematics. Therefore, the synthetic electromagnetic wave reflecting structure phase distribution has the effect of multi-beam reflection.

In the step S04 of shifting a phase principal value, the synthetic electromagnetic wave reflecting structure phase distribution corresponds to the reflecting element phase curve of any one of the reflecting elements 2 in the operating frequency. That is, a plurality of synthetic reflection phase shifts of the synthetic electromagnetic wave reflecting structure phase distribution are performed with a principal value process according to the phase period interval. As shown in FIG. 22, the synthetic electromagnetic wave reflecting structure phase distribution after the principal value process shifts to correspond to the range of the size corresponding to the range of the reflection phase of any one of the reflecting elements 2 at the operating frequency.

Figure 23:
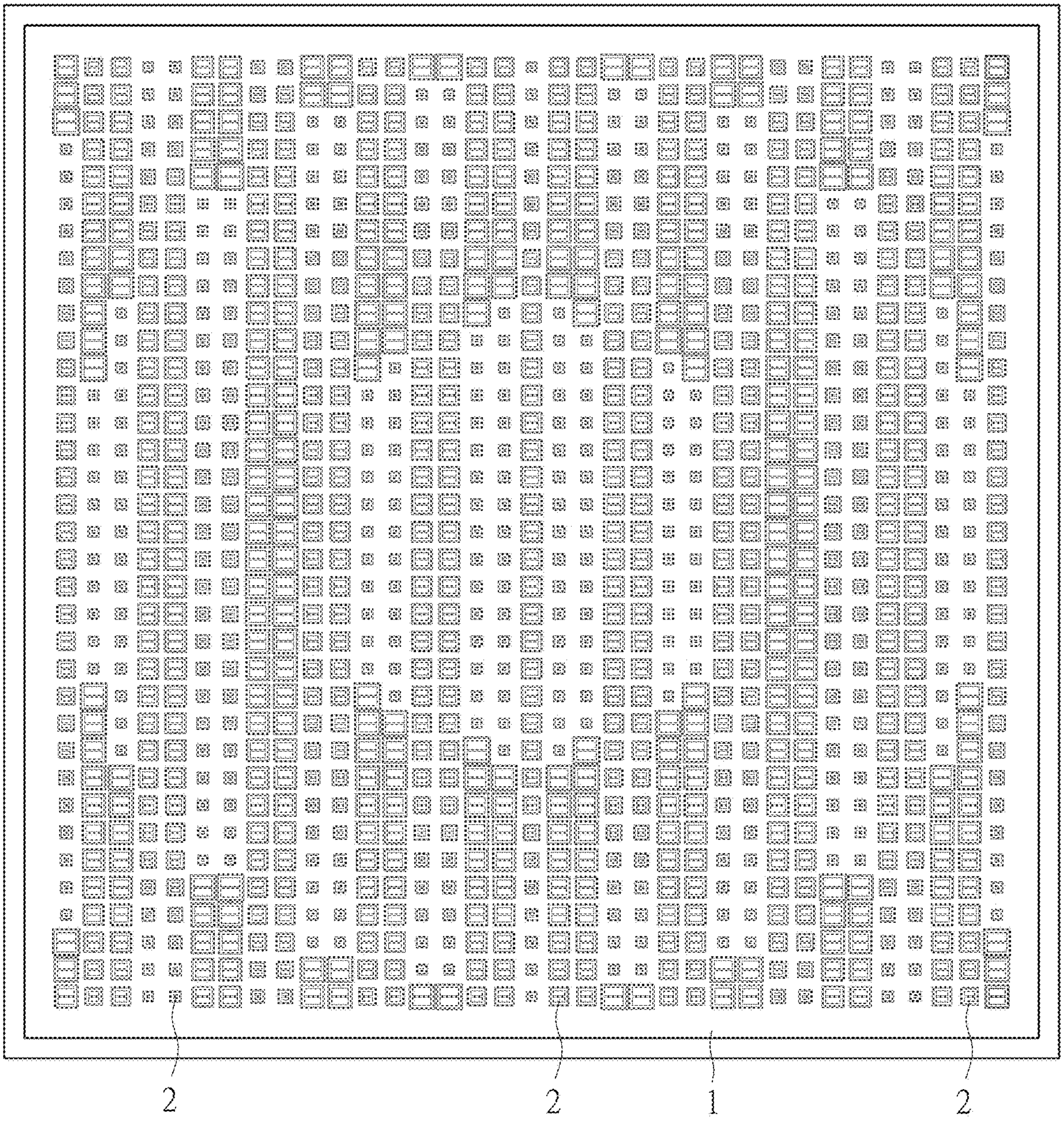
FIG. 23 is a schematic diagram illustrating the manufactured electromagnetic wave reflecting structure with the incident wave pointing angle at 30 degrees and the reflected wave pointing angle at −30 degrees.

In the step S05 of setting and arranging, the reflecting elements 2 are arranged on the substrate 1 according to the synthetic reflection phase shifts of the synthetic electromagnetic wave reflecting structure phase distribution corresponding to the reflecting element reflection phase curve of any one of the reflecting elements 2 at the operating frequency, as shown in FIG. 23.

Furthermore, the electromagnetic wave reflecting structure phase distribution with two reflected wave pointing angles of 30 degrees and −30 degrees after the principal value process is obtained from the first embodiment, after the step S06 of obtaining a synthetic electromagnetic wave reflecting structure phase distribution, the electromagnetic wave reflecting structure phase distributions of the electromagnetic wave reflecting structures are converted into the electromagnetic wave reflecting structure phasor distributions, and then the electromagnetic wave reflecting structure phasor distributions are performed with the phasor superposition and the conversion to obtain the synthetic electromagnetic wave reflecting structure phase distribution. That is, the step S06 of obtaining a synthetic electromagnetic wave reflecting structure phase distribution and the step S04 of shifting a phase principal value are exchanged.

Furthermore, combining the electromagnetic wave reflecting structures corresponding to different reflected wave pointing angles directly, it is possible to achieve an electromagnetic wave incidence, but the combined electromagnetic wave reflecting structures each have a reflection effect at the respective reflected wave pointing angles.

Figure 24:
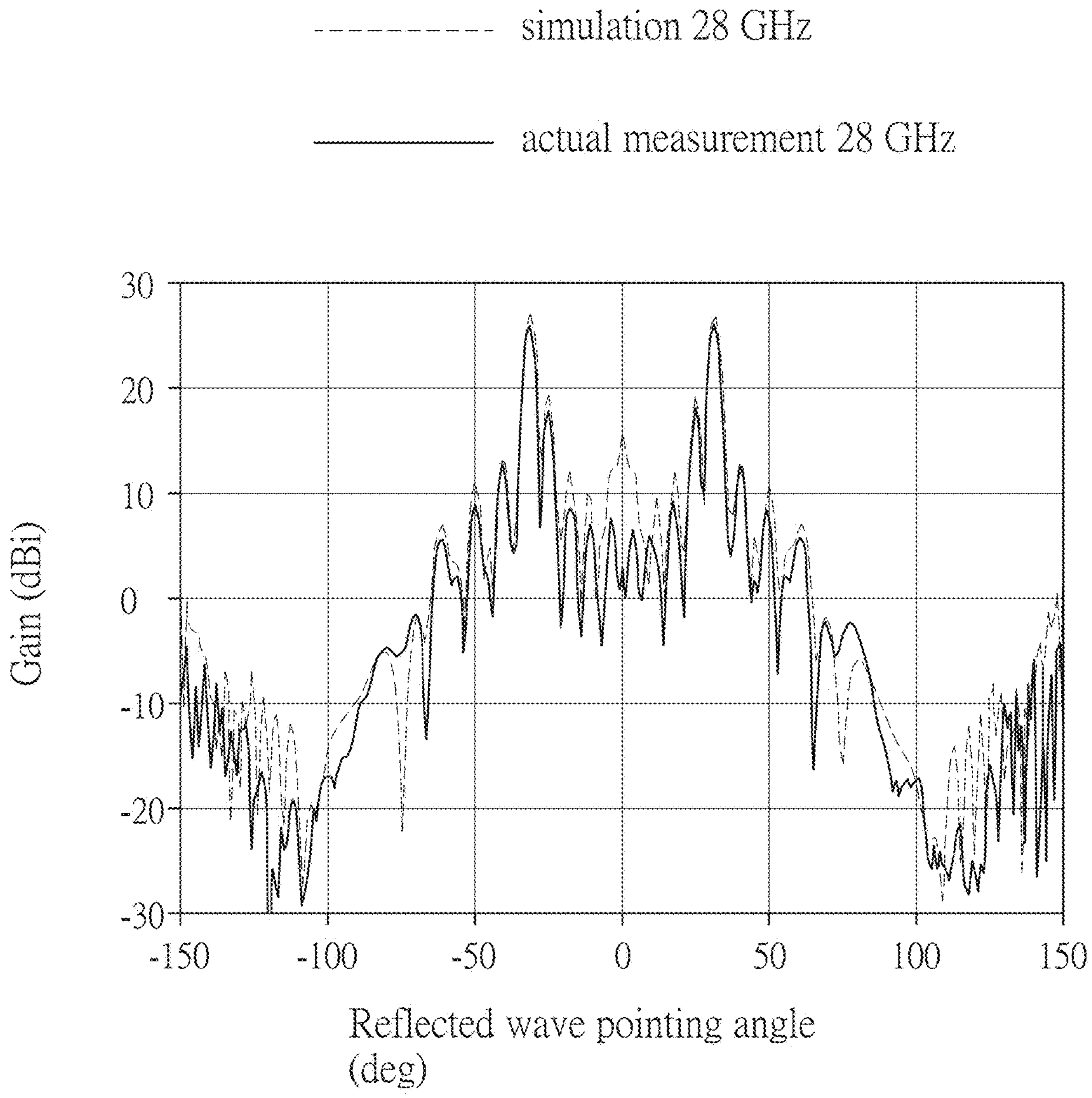
FIG. 24 is a measurement and simulation diagram illustrating the change of the gain and the reflected wave pointing angle of the electromagnetic wave reflecting structure.

FIG. 24 illustrates the changes of the gain and the reflected wave pointing angle of the actual measurement and the simulation of the electromagnetic wave reflecting structure designed according to the above steps. It can be seen from the diagram that when the actual measured result and the simulation are in the 28 GHz frequency band, the gain performance is good when the reflected wave pointing angles are 30 degrees and −30 degrees, and the simulation result is also very close to the actual measurement result.

In addition, if a plurality of signal sources are incident with a plurality of communication blind zones in the vicinity, the electromagnetic wave reflecting structure for multi-beam incident and multi-beam reflection can eliminate the plurality of communication blind zones of different signal sources by a single structure and improve the signal coverage. It is worth mentioning that the number of the signal sources is not necessary to be the same as the number of the communication blind zones. In this situation, in the step S03 of obtaining an electromagnetic wave reflecting structure phase distribution, the respective electromagnetic wave reflecting structure phase distributions of the electromagnetic wave reflecting structures are obtained according to the operating frequency, the incident wave pointing angle and the incident distance corresponding to different reflected wave pointing angles. Each incident wave pointing angle, each incident distance and the spatial coordinate locations of each electromagnetic wave source with respect to the reference point corresponding to one of the reflected wave pointing angles are put into the formulas (1) and (2) to obtain a corresponding one of the electromagnetic wave reflecting structure phase distributions. Next, in the step S06 of obtaining a synthetic electromagnetic wave reflecting structure phase distribution, the process could be the same as in the second embodiment to obtain the synthetic electromagnetic wave reflecting structure phase distribution. The synthetic electromagnetic wave reflecting structure phase distribution, therefore, can be used for multi-beam incident and multi-beam reflection.

Figure 25:
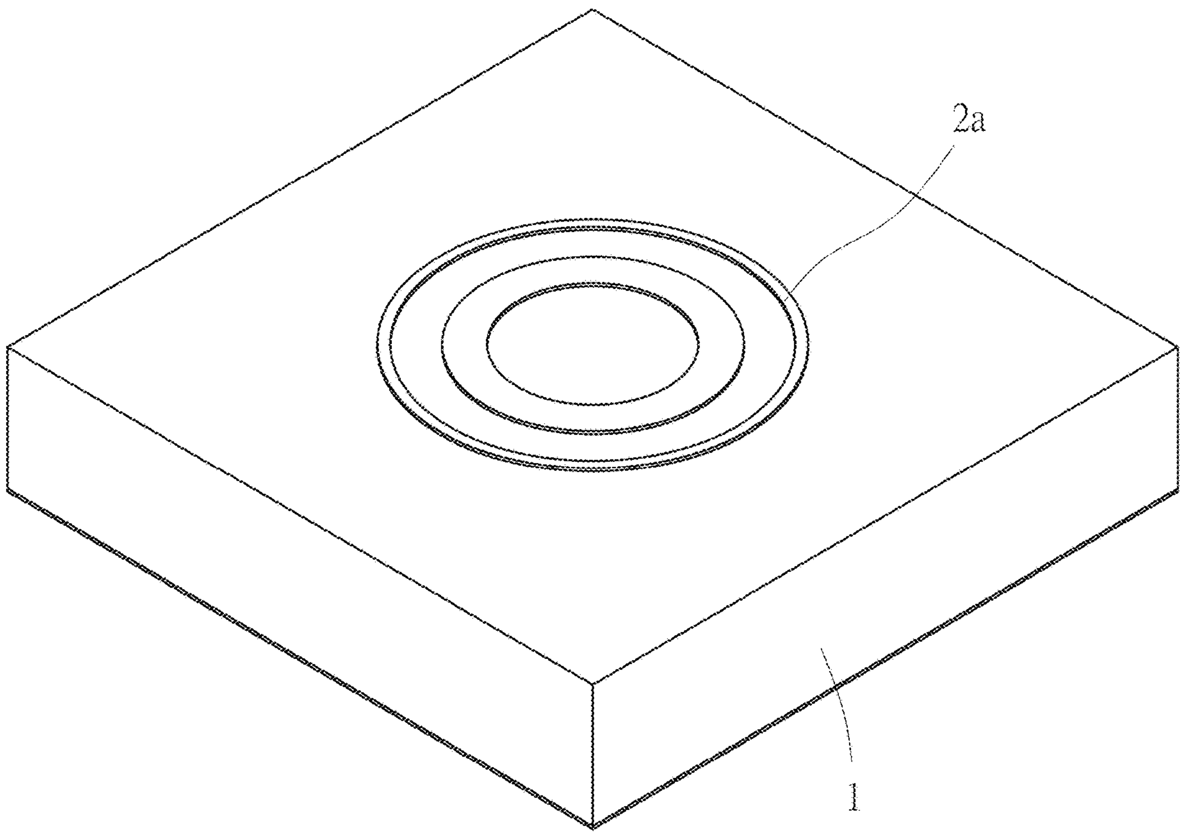
FIG. 25 is a perspective view illustrating the structure of a second reflecting element created by using the simulation software.
Figure 26:
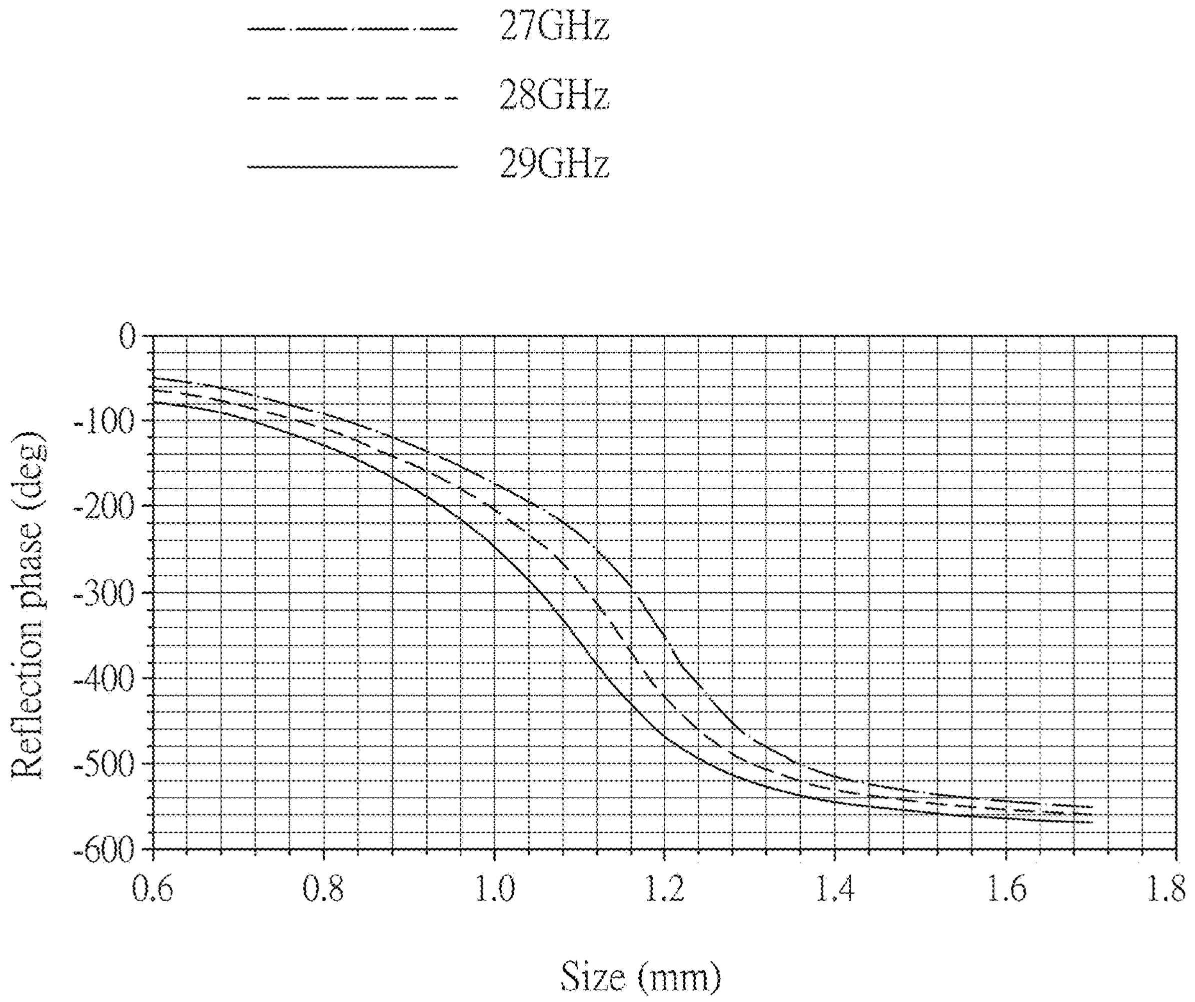
FIG. 26 is a simulation diagram illustrating multiple reflecting element phase curves when the second reflecting element is in the 27 GHz, 28 GHz, and 29 GHz frequency bands.

Moreover, if a plurality of signal sources are incident with only single one communication blind zone in the vicinity, the electromagnetic wave reflecting structure for multi-beam incident and single-beam reflection can eliminate the communication blind zone of different signal sources by a single structure and improve the signal coverage. It is worth mentioning that the number of the signal sources is not necessary to be the same as the number of the communication blind zones. In this situation, in the step S03 of obtaining an electromagnetic wave reflecting structure phase distribution, the electromagnetic wave reflecting structure phase distribution of the electromagnetic wave reflecting structure is obtained according to the operating frequency of each electromagnetic wave, the incident wave pointing angle, the incident distance, and the reflected wave pointing angle. Each incident wave pointing angle, each incident distance, the spatial coordinate location of each electromagnetic wave source with respect to the reference point, and the reflected wave pointing angle are put into the formulas (1) and (2) to obtain a corresponding one of the electromagnetic wave reflecting structure phase distributions. Next, in the step S06 of obtaining a synthetic electromagnetic wave reflecting structure phase distribution, the process could be the same as in the second embodiment to obtain the synthetic electromagnetic wave reflecting structure phase distribution. The synthetic electromagnetic wave reflecting structure phase distribution, therefore, can be used for multi-beam incident and single-beam reflection Furthermore, referring to FIG. 25 and FIG. 26, a conventional reflecting element may be applied to the electromagnetic wave reflecting structure of the present disclosure. The following is an explanation. The original reflecting element 2 is represented as a first reflecting element. The conventional reflecting element shown in FIG. 25 is represented as a second reflecting element 2*a*. The second reflecting element 2*a* includes two spaced circular metal sheets arranged concentrically. When the operating frequency is in the 27 GHz, 28 GHz and 29 GHz frequency bands and the incident wave pointing angle is 0 degrees, it can be seen from the phase curve of the second reflecting element 2*a* that a variable size of the second reflecting element 2*a* corresponding to a reflection phase is an outer radius of the innermost circular metal sheet. The applicable size of the second reflecting element 2*a* is in the range of 0.6 mm to 1.4 mm.

Figure 27:
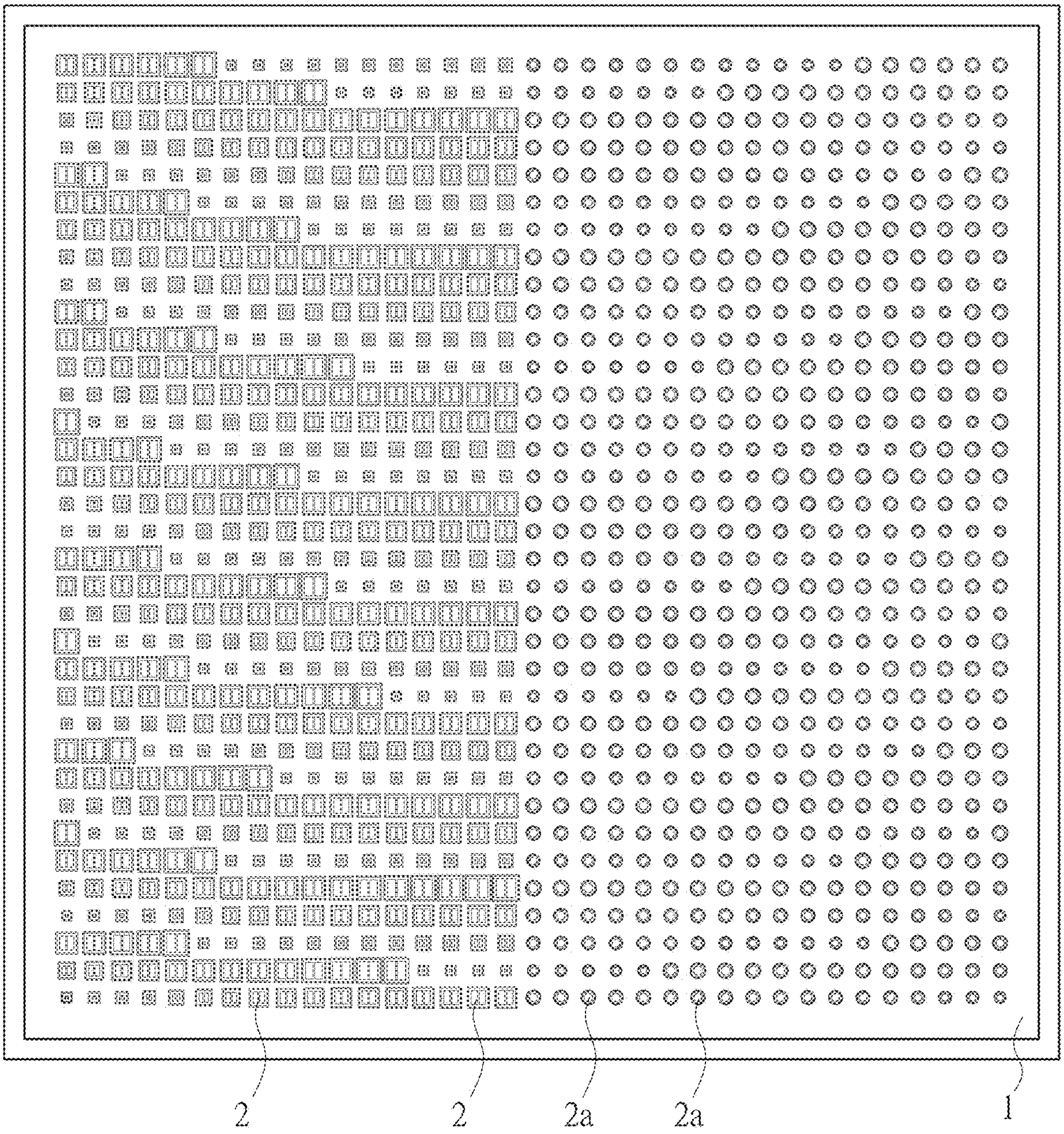
FIG. 27 is a schematic diagram illustrating the manufactured first electromagnetic wave reflecting structure with the incident wave pointing angle at 0 degrees and the reflected wave pointing angle at −30 degrees.
Figure 28:
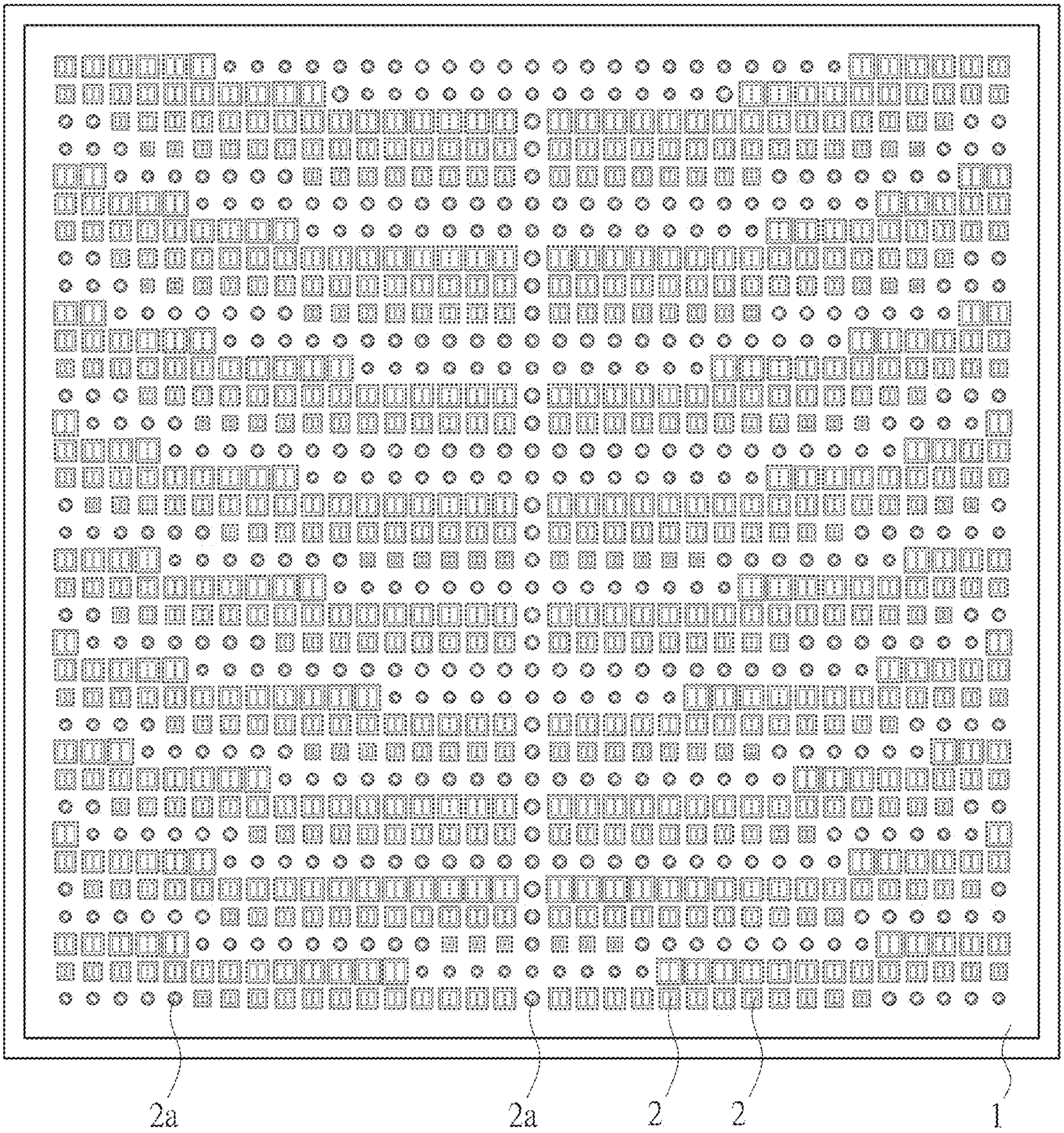
FIG. 28 is a schematic diagram illustrating the manufactured second electromagnetic wave reflecting structure with the incident wave pointing angle at 0 degrees and the reflected wave pointing angle at −30 degrees.

FIG. 27 shows a first electromagnetic wave reflecting structure. FIG. 28 shows a second electromagnetic wave reflecting structure. In the first electromagnetic wave reflecting structure, one half of the substrate 1 is provided with the reflecting elements 2 of the present disclosure, and another half of the substrate 1 is provided with the second reflecting elements 2*a*. In the second electromagnetic wave reflecting structure, the reflecting elements 2 of the present disclosure and the second reflecting elements 2 are arranged on the substrate 1 in a mixed manner.

Figure 29:
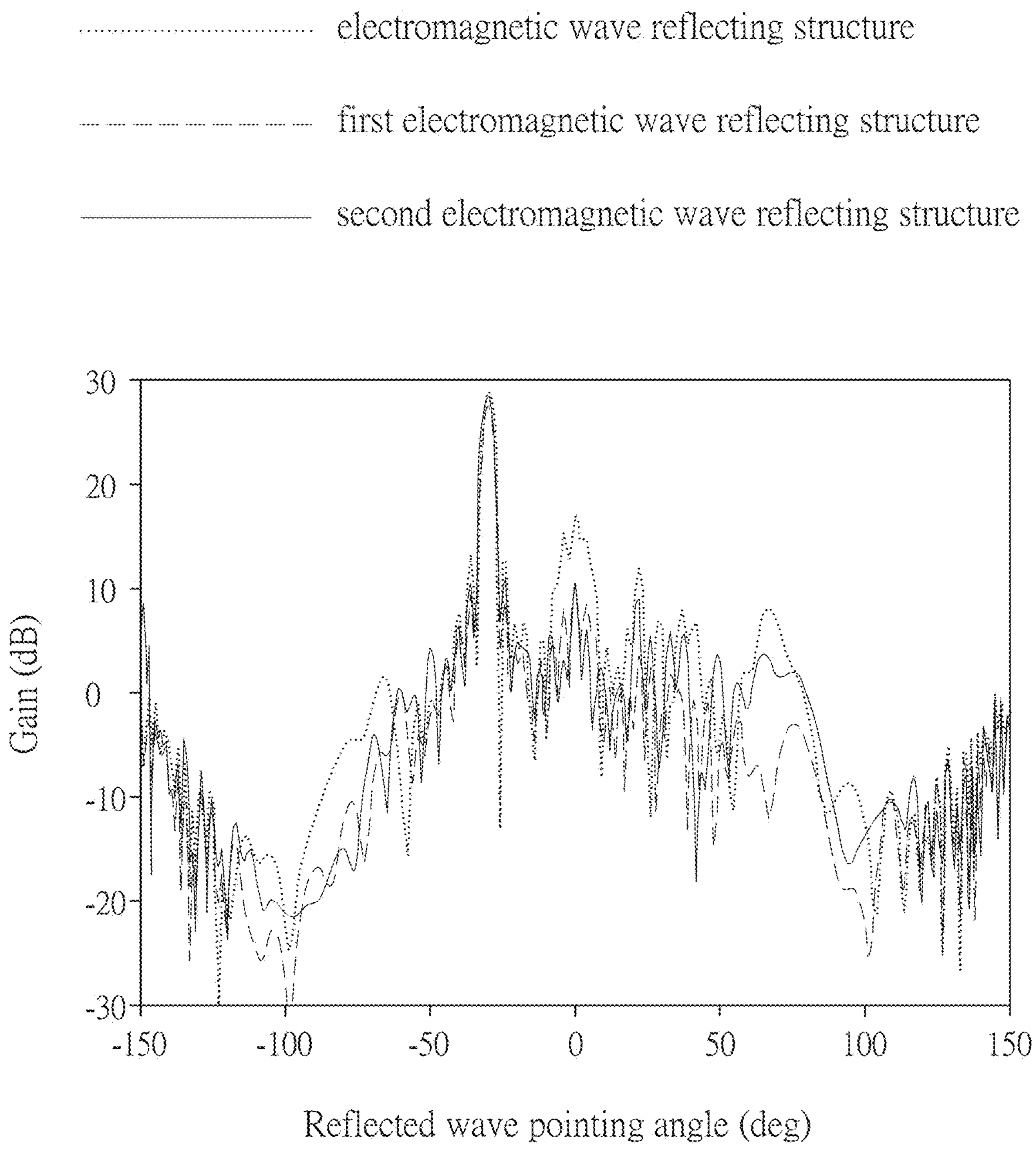
FIG. 29 is a measurement diagram illustrating the change of the gain and the reflected wave pointing angle of the first embodiment, the first electromagnetic wave reflecting structure and the second electromagnetic wave reflecting structure when the incident wave pointing angle is 0 degrees and the reflected wave pointing angle is 30 degrees.

FIG. 29 illustrates the changes of the gain and the reflected wave pointing angle of the electromagnetic wave reflecting structure according to the first embodiment of the present disclosure, the first electromagnetic wave reflecting structure and the second electromagnetic wave reflecting structure when the incident wave pointing angle is 0 degrees and the reflected wave pointing angle is −30 degrees. It can be seen from the diagram that they have good gains when the reflected wave pointing angle is −30 degrees. More specifically, the first electromagnetic wave reflecting structure and the second electromagnetic wave reflecting structure can more effectively reduce the energy intensity of the sidelobes compared with the electromagnetic wave reflecting structure, so that the reflection directivity of the set reflected wave pointing angle is better. Therefore, the reflecting elements 2 and the second reflecting elements 2*a* arranged in a mixed manner on the substrate 1 can reduce the energy intensity of the sidelobes more effectively, so that the reflection of the set reflected wave pointing angle achieves better directivity. Furthermore, the positions and structures of the reflecting elements 2 and the second reflecting elements 2*a* arranged on the substrate 1 are adjustable and selective according to the proportion of reflection of each reflecting element 2 and each second reflecting element 2*a*, so as to reduce the energy intensity of the sidelobes more effectively.

Figure 30:
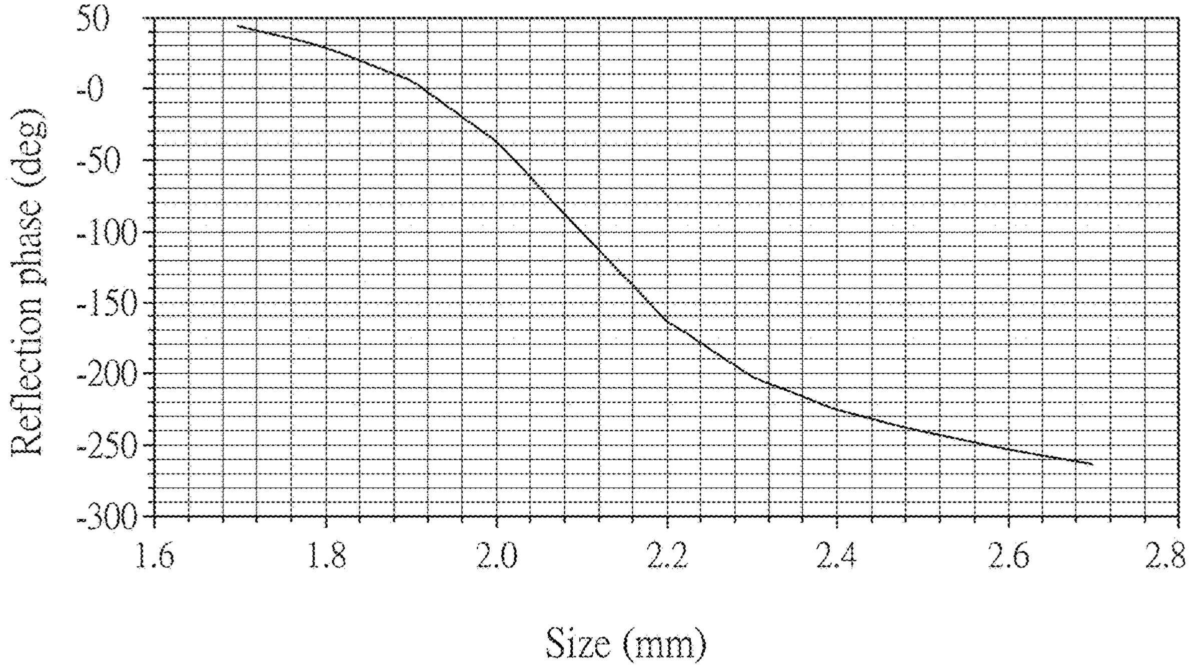
FIG. 30 is a simulation diagram illustrating a phase curve of the second reflecting element in the 13.325 GHz frequency band.
Figure 31:
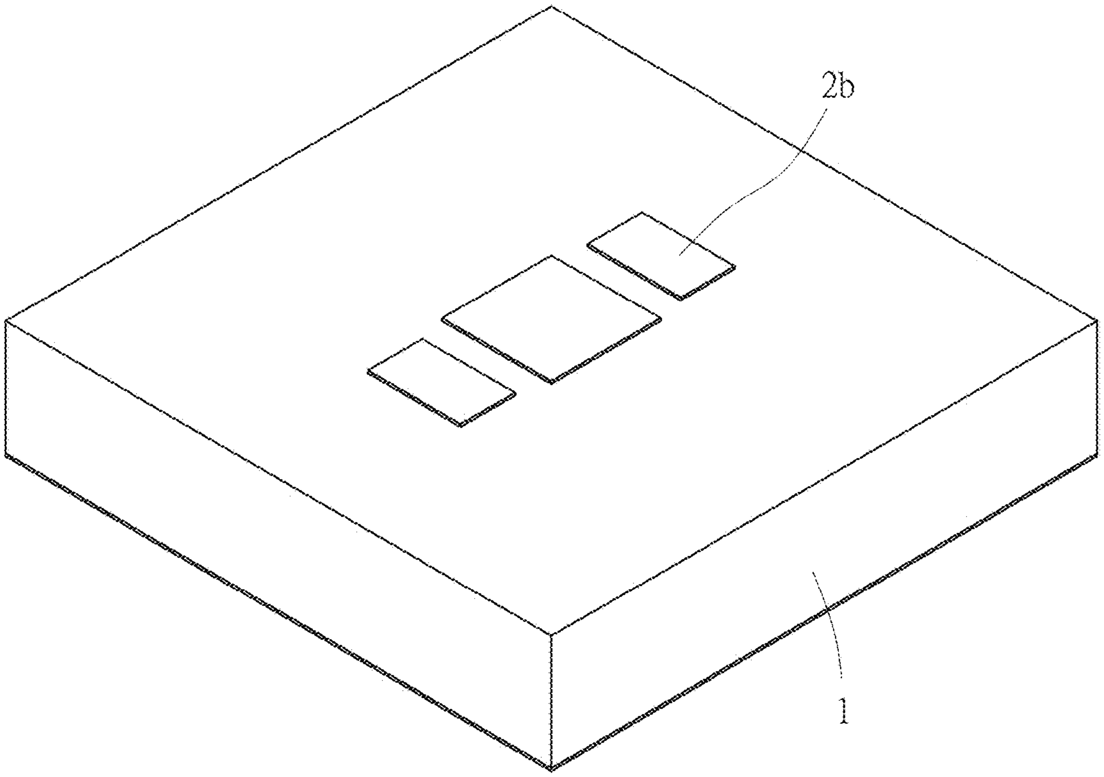
FIG. 31 is a perspective view illustrating the structure of a third reflecting element created by using the simulation software.
Figure 32:
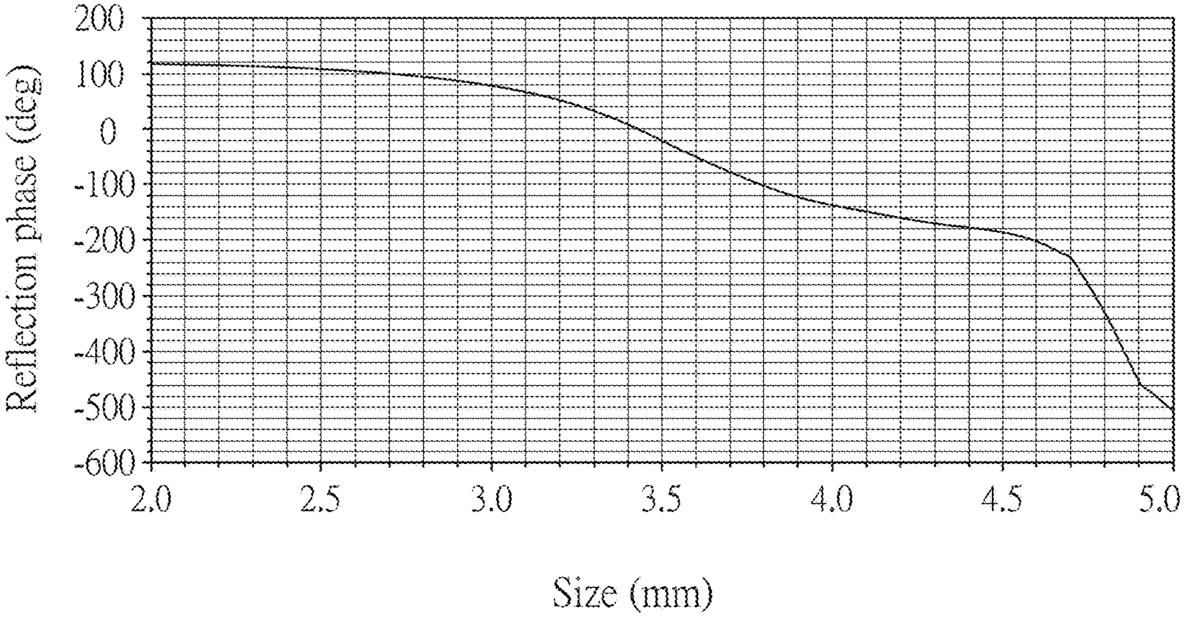
FIG. 32 is a simulation diagram illustrating a phase curve of the third reflecting element in the 124 GHz frequency band.
Figure 33:
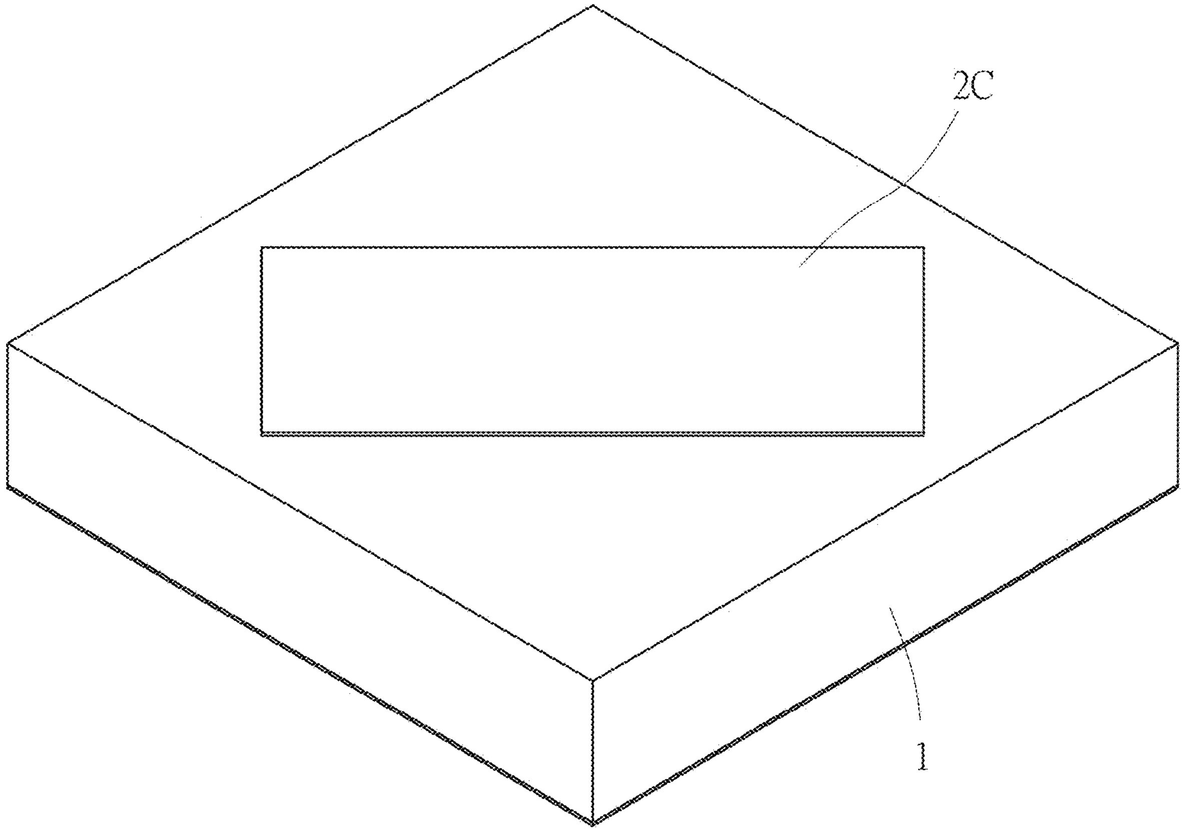
FIG. 33 is a perspective view illustrating the structure of a fourth reflecting element created by using the simulation software.
Figure 34:
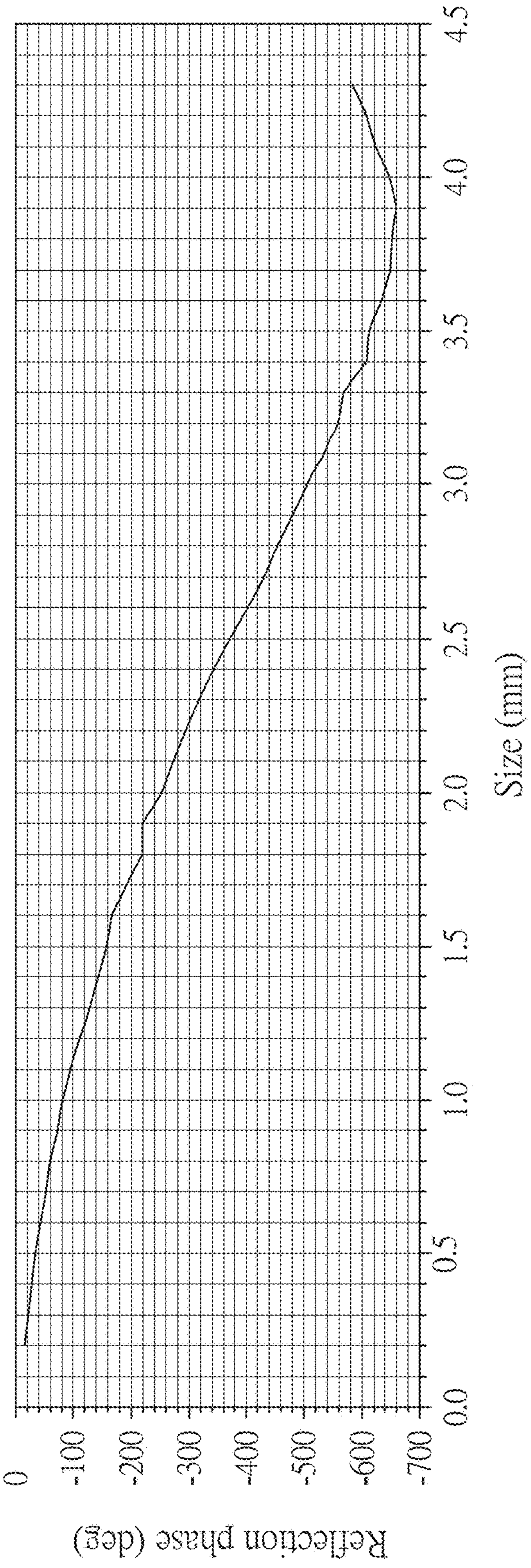
FIG. 34 is a simulation diagram illustrating a phase curve of the fourth reflecting element in the 10 GHz frequency band.
Figure 35:
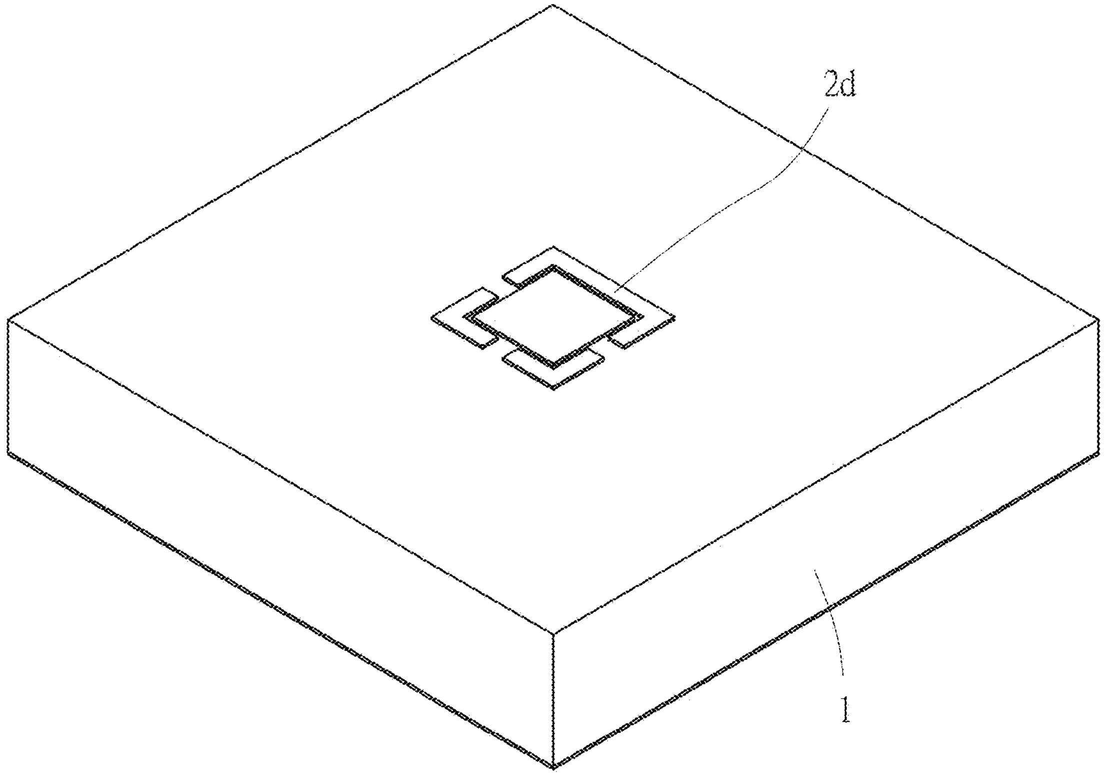
FIG. 35 is a perspective view illustrating the structure of a fifth reflecting element created by using the simulation software.
Figure 36:
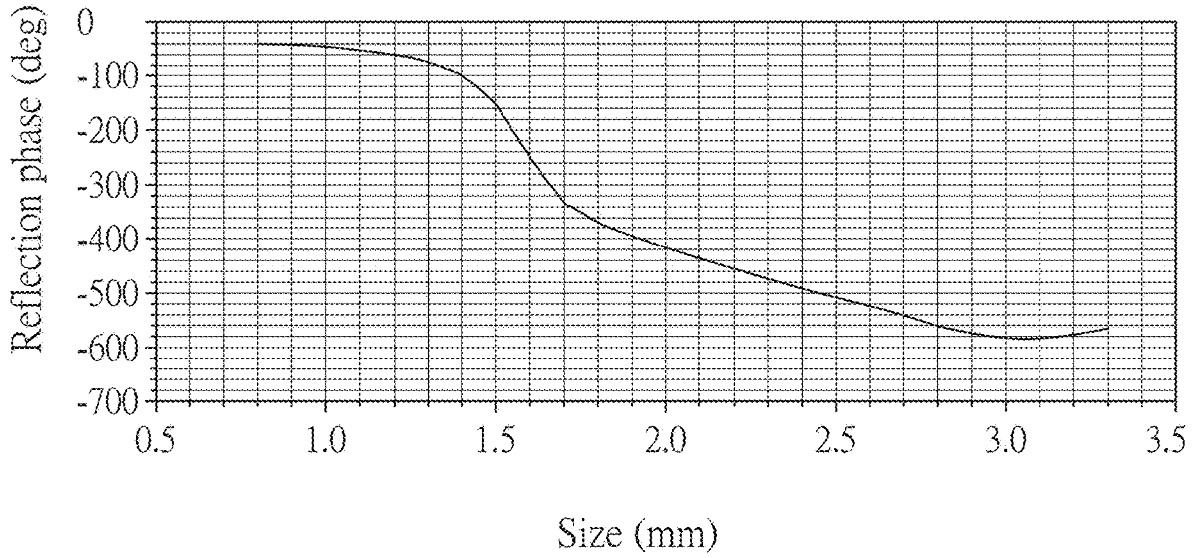
FIG. 36 is a simulation diagram illustrating a phase curve of the fifth reflecting element in the 28 GHz frequency band.
Figure 37:
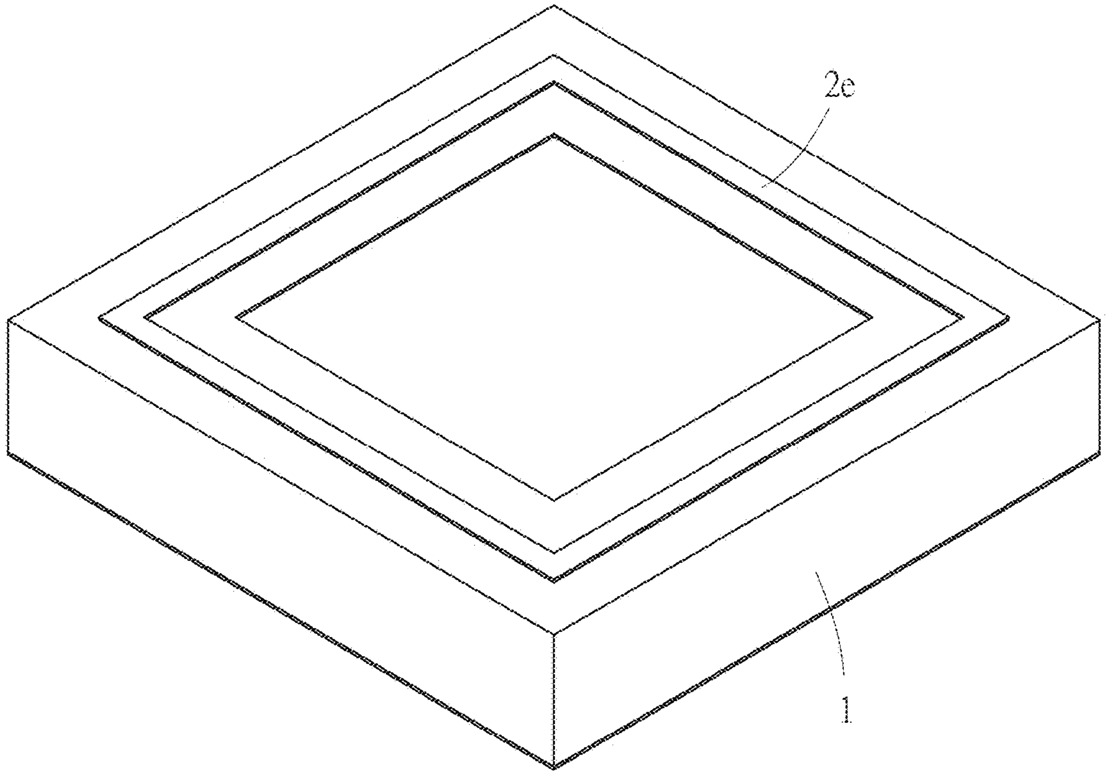
FIG. 37 is a perspective view illustrating the structure of a sixth reflecting element created by using the simulation software.
Figure 38:
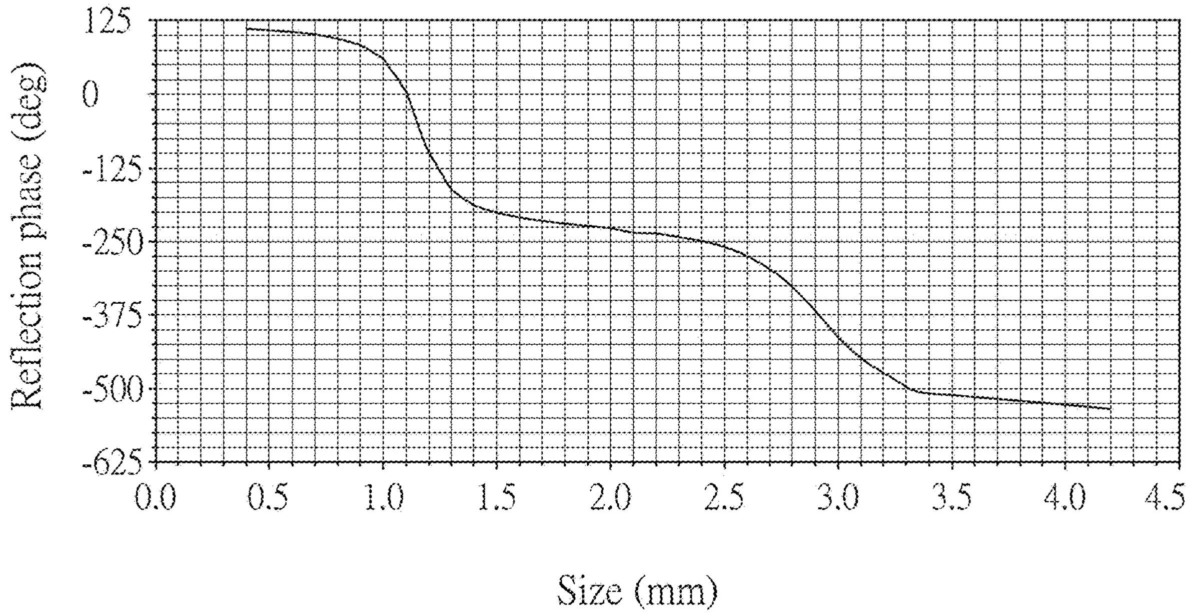
FIG. 38 is a simulation diagram illustrating a phase curve of the sixth reflecting element in the 28 GHz frequency band.

Referring to FIG. 30, the second reflecting element 2*a* can be applied to the operating frequency of 13.325 GHz by changing its size. Another conventional third reflecting element 2*b* has three rectangular metal sheets arranged at intervals as shown in FIG. 31. The phase curve of the third reflecting element 2*b* in the operating frequency of 24 GHz is as shown in FIG. 32. The third reflecting element 2*b* can be applied to the operating frequency of 24 GHz. A variable size of the third reflecting element 2*b* corresponding to a reflection phase is a long side of the middle rectangular metal sheet. Another conventional fourth reflecting element 2*c* is in the form of a rectangular metal sheet as shown in FIG. 33. The phase curve of the fourth reflecting element 2*c* in the operating frequency of 10 GHz is shown in FIG. 34. The fourth reflecting element 2*c* can be applied to the operating frequency of 10 GHz. A variable size of the fourth reflecting element 2*c* corresponding to a reflection phase is a short side of the rectangular metal sheet. A conventional fifth reflecting element 2*d* has a horseshoe-shaped metal sheet and two L-shaped metal sheets that are arranged at intervals and surround a square metal sheet, as shown in FIG. 35. The phase curve of the fifth reflecting element 2*d* in the operating frequency of 28 GHz is shown in FIG. 36. The fifth reflecting element 2*d* can be applied to the operating frequency of 28 GHz. A variable size of the fifth reflecting element 2*d* corresponding to a reflection phase is the length of one side of the square metal sheet. Another conventional sixth reflecting element 2*e* has a square metal sheet surrounding another square metal sheet, as shown in FIG. 37. The phase curve of the sixth reflecting element 2*e* in the operating frequency of 28 GHz is shown in FIG. 38. The sixth reflecting element 2*e* can be applied to the operating frequency of 28 GHz. A variable size of the sixth reflecting element 2*e* corresponding to a reflection phase is the length of one side of the square metal sheet. Therefore, the electromagnetic wave reflecting structure of the present disclosure can be applied to the second reflecting element 2*a*, the third reflecting structure 2*b*, the fourth reflecting structure 2*c*, the fifth reflecting structure 2*d*, the sixth reflecting structure 2*e* and their equivalent structures. In addition, the reflecting elements disposed on the substrate 1 include a combination of any two or more of the first reflecting element, the second reflecting element 2*a*, the third reflecting element 2*b*, the fourth reflecting element 2*c*, the fifth reflecting element 2*d*, and the sixth reflecting element 2*e*. The reflecting elements arranged in a mixed manner can reduce the energy intensity of the side lobes more effectively, so that the reflection of the set reflected wave pointing angle achieves better directivity.

Figure 39:
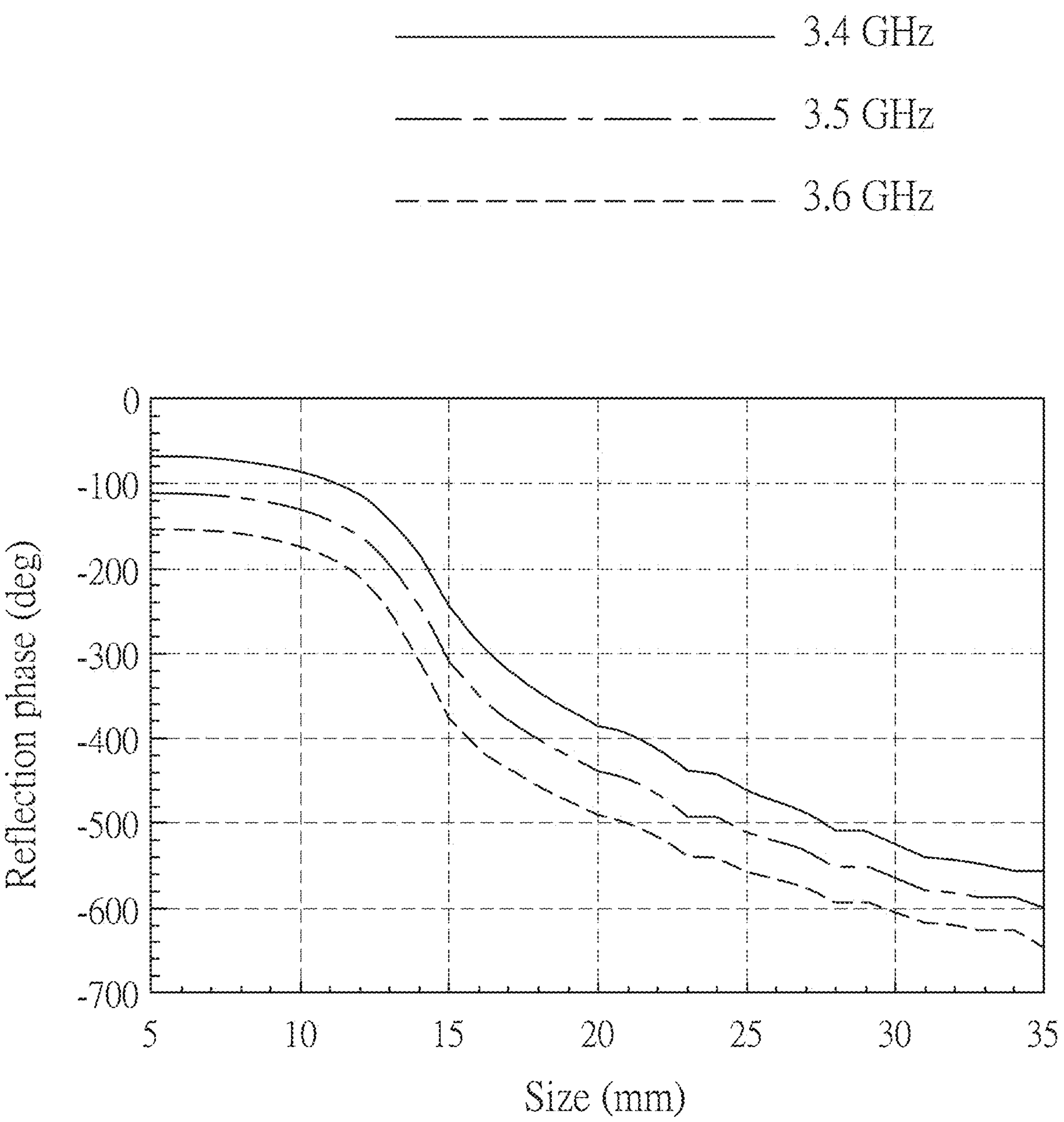
FIG. 39 is a simulation diagram illustrating multiple reflecting element phase curves when the first reflecting element is in the 3.4 GHz, 3.5 GHz, and 3.6 GHz frequency bands.
Figure 40:
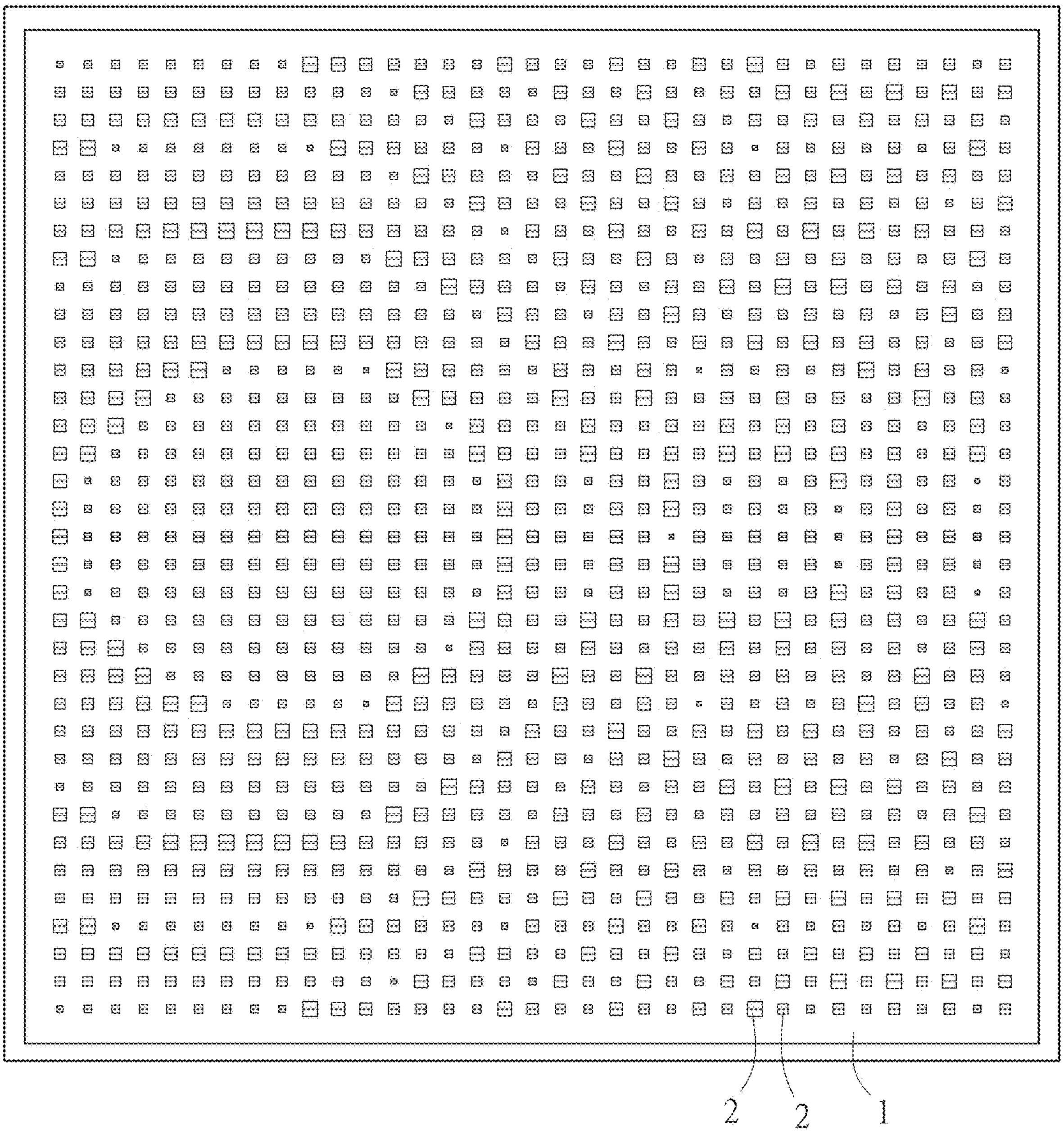
FIG. 40 is a schematic diagram illustrating the manufactured electromagnetic wave reflecting structure in the 3.5 GHz when the incident wave pointing angle is at 0 degrees and the reflected wave pointing angle is at −30 degrees.
Figure 41:
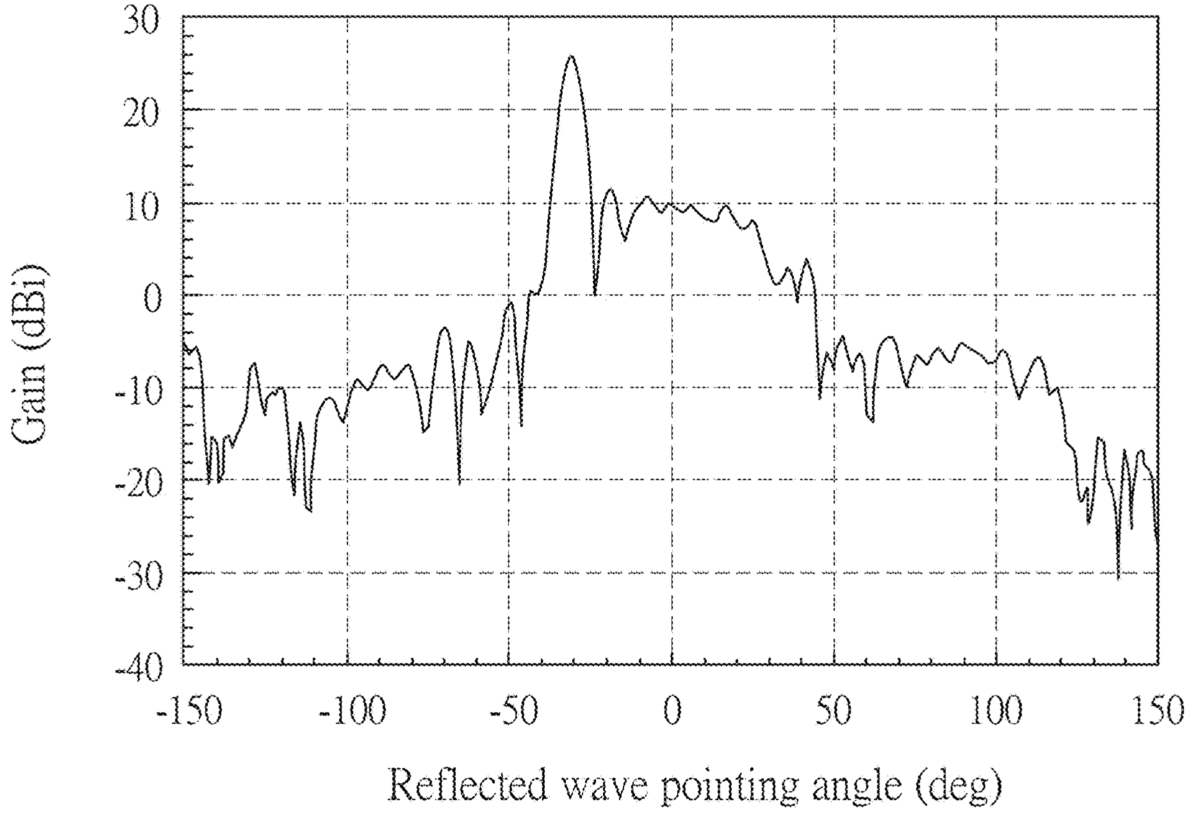
FIG. 41 is a simulation diagram illustrating the change of the gain and the reflected wave pointing angle of the electromagnetic wave reflecting structure in the 3.5 GHz frequency band.
Figure 42:
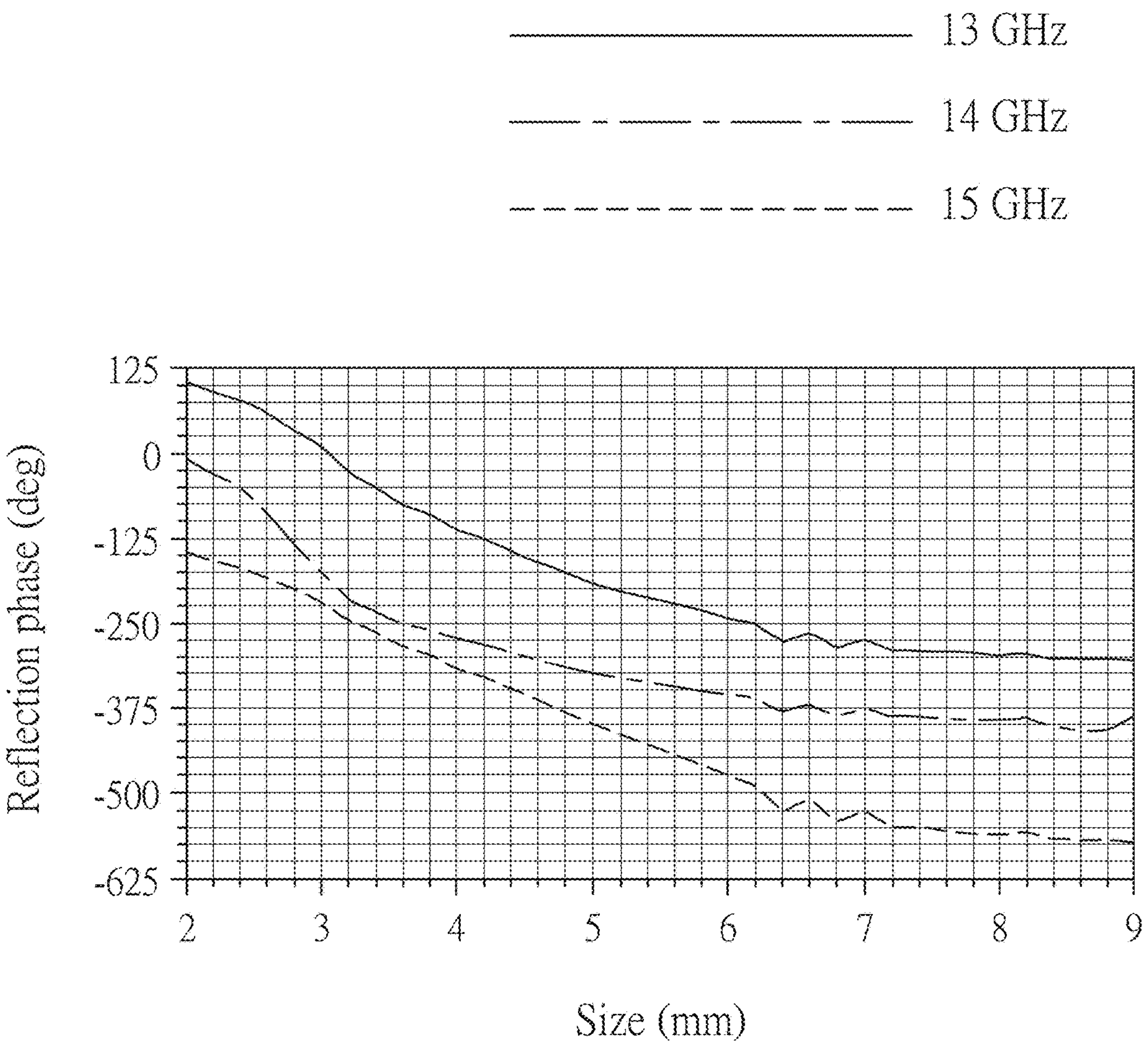
FIG. 42 is a simulation diagram illustrating multiple reflecting element phase curves when the first reflecting element is in the 13 GHz, 14 GHz, and 15 GHz frequency bands.

Refer to FIG. 39 through FIG. 41, changing the size of the reflecting elements 2, namely, the size of the first reflecting elements, allows the electromagnetic wave reflecting structure to be designed in 3.5 GHz. Wherein, the operating frequency is 3.5 GHz, the reflected wave pointing angle is −30 degrees, the incident wave pointing angle is 0 degrees, and the incident distance is 60 cm. The reflecting element phase curve of any one of the reflecting elements 2 in 3.4 GHz, 3.5 GHz and 3.6 GHz is shown in FIG. 39. The designed electromagnetic wave reflecting structure is shown in FIG. 40. FIG. 41 illustrates the change of the simulated gain and reflected wave pointing angle of the electromagnetic wave reflecting structure. It can be seen from the diagram that in the 3.5 GHz frequency band, the reflected wave pointing angle at −30 degrees has a good gain. In addition, the electromagnetic wave reflecting structure may be designed in 14 GHz. Wherein, the reflecting element phase curves of any one of the reflecting elements 2 in 13 GHz, 14 GHz and 15 GHz is as shown in FIG. 42.

To sum up, through the step S01 of presetting parameters, the step S02 of obtaining a reflecting element phase curve, the step S03 of obtaining an electromagnetic wave reflecting structure phase distribution, the step S04 of shifting a phase principal value and the step S05 of setting and arranging, the electromagnetic wave reflecting structure for single beam incident and single beam reflection can be manufactured at a low cost. The electromagnetic wave reflecting structure does not consume power, does not require special maintenance, is energy-saving, and can reflect the electromagnetic wave to eliminate the communication blind spots to improve the signal coverage. When the electromagnetic wave reflecting structure is not used, there will be no radiation generated by the electromagnetic wave, so that nearby residents can feel at ease. In addition, the electromagnetic wave reflecting structure is a low-profile plate, which occupies a small space and is compatible with the decoration of environmental buildings. It is actually another choice to solve the poor electromagnetic wave transmission. Wherein, through the structure of any one of the reflecting elements 2 to make the reflecting element phase curve smooth and the slope being not zero, any reflecting element 2 within the size range corresponding to the operating frequency can be used. If the reflecting element phase curves of any reflecting element 2 in different frequency bands are in an equidistant state, any reflecting element 2 can be applied to a broad bandwidth. Preferably, by adding the step S06 of obtaining a synthetic electromagnetic wave reflecting structure phase distribution, the electromagnetic wave reflecting structure for single-beam incident and multi-beam reflection or the electromagnetic wave reflecting structure for multi-beam incident and single-beam reflection or the electromagnetic wave reflecting structure for multi-beam incident and multi-beam reflection can be manufactured, so that the application is more widely. Through the reflecting elements with different structures arranged on the substrate 1 in a mixed manner, the energy intensity of the sidelobes can be reduced more effectively, so that the reflection of the set reflected wave pointing angle can achieve better directivity.

Although particular embodiments of the present disclosure have been described in detail for purposes of illustration, various modifications and enhancements may be made without departing from the spirit and scope of the present disclosure. Accordingly, the present disclosure is not to be limited except as by the appended claims.

What is claimed is:

1. A reflecting element, comprising:

two first metal sheets, each first metal sheet having a horseshoe shape, the first metal sheets being arranged facing each other to form a rectangle, a first spacing P being defined between the first metal sheets; and two second metal sheets, each second metal sheet being configured in a substantially rectangular shape, the second metal sheets being arranged side by side between the first metal sheets, a second spacing S being defined between proximal side edges of the second metal sheets, the spacing S being unchanged along an entire length L of the second metal sheets.

2. The reflecting element as claimed in claim 1, wherein each first metal sheet includes an extension section and two turning sections, the turning sections are connected to two ends of the extension section respectively and extend in a direction perpendicular to the extension section, a length of the extension section of any one of the first metal sheets is substantially equal to the length of each second metal sheet plus six times a width of any one of the turning sections, a length of each turning section is substantially equal to one half of the length of the extension section minus the first spacing, and a width of each second metal sheet is substantially equal to one half of the length of each second metal sheet minus the second spacing.

3. An electromagnetic wave reflecting structure, adapted for guiding a plurality of electromagnetic waves emitted from a plurality of electromagnetic wave sources to be reflected at a plurality of reflected wave pointing angles, the electromagnetic waves having an operating frequency and each being incident at a respective incident wave pointing angle, the electromagnetic wave reflecting structure comprising:

a substrate having a surface on which a reference point is defined; and a plurality of the reflecting elements disposed on the surface, wherein each reflecting element includes two first metal sheets each having a horseshoe shape and two second metal sheets each being configured in a substantially rectangular shape, in which the two first metal sheets are arranged facing each other to form a rectangle, a first spacing P is defined between the two first metal sheets, the two second metal sheets are arranged side by side between the two first metal sheets, a second spacing S is defined between proximal side edges of the second metal sheets, and the spacing S is unchanged along an entire length L of the second metal sheets;

wherein a synthetic reflection phase shift of the i-th reflecting element among the reflecting elements is related to different incident distances of the plurality of electromagnetic wave sources and a phasor superposition of a plurality of reflected phase shifts of the i-th reflecting element corresponding to the plurality of reflected wave pointing angles, wherein each reflection phase shift of the i-th reflecting element is related to a coordinate location of the i-th reflecting element with respect to the reference point, a wave number at the operating frequency, a respective one of the reflected wave pointing angles, and the incident distance of a corresponding one of the plurality of electromagnetic wave sources to the i-th reflecting element;

wherein a size of the i-th reflecting element among the reflecting elements is related to the synthetic reflection phase shift of the i-th reflecting element on the substrate and a reflection phase of any one of the reflecting elements at the operating frequency.

4. The electromagnetic wave reflecting structure as claimed in claim 3, wherein each reflection phase shift of the i-th reflecting element on the substrate and the incident distance of each electromagnetic wave source to the i-th reflecting element are obtained by the following formulas:

$$\Phi_R(x_i,y_i)=k[d_i-(x_i\cos\Phi_B+y_i\sin\Phi_B)\sin\theta_B]\pm 2N\pi \quad (1)$$

$$d_i=[(x_F-x_i)^2+(y_F-y_i)^2+z_F^2]^{0.5} \quad (2)$$

wherein $(x_i, y_i)$ is the coordinate location of the i-th reflecting element relative to the reference point, $\Phi_R(x_i, y_i)$ is each reflection phase shift of the i-th reflecting element, k is the wave number at the operating frequency, $(\theta_B, \Phi_B)$ is a respective of the reflected wave pointing angles, $d_i$ is the incident distance of a respective one of the electromagnetic wave sources to the i-th reflecting element, $(x_F, y_F, z_F)$ is the spatial coordinate location of a respective one of the electromagnetic wave sources relative to the reference point, and N is a natural number.

5. The electromagnetic wave reflecting structure as claimed in claim 3, wherein a length of at least one of the second metal sheets of the i-th reflecting element is related to the synthetic reflection phase shift of the i-th reflecting element on the substrate and a reflection phase of any one of the reflecting elements at the operating frequency.

6. The electromagnetic wave reflecting structure as claimed in claim 5, wherein each first metal sheet includes an extension section and two turning sections, the turning sections are connected to two ends of the extension section respectively and extend in a direction perpendicular to the extension section, a length of the extension section of any one of the first metal sheets is substantially equal to the length of each second metal sheet plus six times a width of any one of the turning sections, a length of each turning section is substantially equal to one half of the length of the extension section minus the first spacing, and a width of each second metal sheet is substantially equal to one half of the length of each second metal sheet minus the second spacing.

7. An electromagnetic wave reflecting structure, adapted for guiding an electromagnetic wave emitted from an electromagnetic wave source to be reflected at a plurality of reflected wave pointing angles, the electromagnetic wave having an operating frequency and being incident at an incident wave pointing angle, the electromagnetic wave reflecting structure comprising:

a substrate having a surface on which a reference point is defined; and a plurality of the reflecting elements disposed on the surface, wherein each reflecting element includes two first metal sheets each having a horseshoe shape and two second metal sheets each being configured in a substantially rectangular shape, in which the two first metal sheets are arranged facing each other to form a rectangle, a first spacing P is defined between the two first metal sheets, the two second metal sheets are arranged side by side between the two first metal sheets, a second spacing S is defined between proximal side edges of the second metal sheets, and the spacing S is unchanged along an entire length L of the second metal sheets;

wherein a synthetic reflection phase shift of the i-th reflecting element among the reflecting elements is related to a phasor superposition of a plurality of reflected phase shifts of the i-th reflecting element which correspond to the plurality of reflected wave pointing angles respectively, wherein each reflection phase shift of the i-th reflecting element is related to a coordinate location of the i-th reflecting element with respect to the reference point, a wave number at the operating frequency, a respective one of the reflected wave pointing angles, and an incident distance of the electromagnetic wave source to the i-th reflecting element;

wherein a size of the i-th reflecting element among the reflecting elements is related to the synthetic reflection phase shift of the i-th reflecting element on the substrate and a reflection phase of any one of the reflecting elements at the operating frequency.

8. An electromagnetic wave reflecting structure, adapted for guiding multiple electromagnetic waves emitted from a plurality of electromagnetic wave sources to be reflected at a reflected wave pointing angle, the electromagnetic waves having an operating frequency and each being incident at a respective incident wave pointing angle, the electromagnetic wave reflecting structure comprising:

a substrate having a surface on which a reference point is defined; and a plurality of the reflecting elements disposed on the surface, wherein each reflecting element includes two first metal sheets each having a horseshoe shape and two second metal sheets each being configured in a substantially rectangular shape, in which the two first metal sheets are arranged facing each other to form a rectangle, a first spacing P is defined between the two first metal sheets, the two second metal sheets are arranged side by side between the two first metal sheets, a second spacing S is defined between proximal side edges of the second metal sheets, and the spacing S is unchanged along an entire length L of the second metal sheets;

wherein a synthetic reflection phase shift of the i-th reflecting element among the reflecting elements is related to a phasor superposition of a plurality of reflected phase shifts of the i-th reflecting element which correspond to the plurality of reflected wave pointing angles respectively, wherein each reflection phase shift of the i-th reflecting element is related to a coordinate location of the i-th reflecting element with respect to the reference point, a wave number at the operating frequency, a respective one of the reflected wave pointing angles, and an incident distance of the electromagnetic wave source to the i-th reflecting element;

wherein a size of the i-th reflecting element among the reflecting elements is related to the synthetic reflection phase shift of the i-th reflecting element on the substrate and a reflection phase of any one of the reflecting elements at the operating frequency.

* * * * *